United States Patent
Oh et al.

(10) Patent No.: US 10,170,974 B1
(45) Date of Patent: Jan. 1, 2019

(54) VARIABLE FREQUENCY AND BURST MODE OPERATION OF PRIMARY RESONANT FLYBACK CONVERTERS

(71) Applicant: Apple Inc., Cupertino, CA (US)

(72) Inventors: InHwan Oh, Cupertino, CA (US); Abby Cherian, Fremont, CA (US); Manisha Pandya, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/718,801

(22) Filed: Sep. 28, 2017

Related U.S. Application Data

(60) Provisional application No. 62/538,135, filed on Jul. 28, 2017, provisional application No. 62/538,146, filed on Jul. 28, 2017, provisional application No. 62/538,156, filed on Jul. 28, 2017.

(51) Int. Cl.
*H02M 1/08* (2006.01)
*H02M 3/335* (2006.01)
*H02M 1/00* (2006.01)

(52) U.S. Cl.
CPC ....... *H02M 1/083* (2013.01); *H02M 3/33576* (2013.01); *H02M 2001/0058* (2013.01)

(58) Field of Classification Search
CPC ............. H02M 1/083; H02M 3/33576; H02M 2001/0058
See application file for complete search history.

(56) References Cited

U.S. PATENT DOCUMENTS

| 5,822,198 | A | 10/1998 | Fraidlin |
|---|---|---|---|
| 5,959,850 | A | 9/1999 | Lim |
| 6,027,829 | A | 2/2000 | Tuttle |
| 6,248,473 | B1 | 6/2001 | Lonsberry |
| 7,070,881 | B2 | 7/2006 | Kishiyama |

(Continued)

FOREIGN PATENT DOCUMENTS

WO   2014190318 A1   11/2014

OTHER PUBLICATIONS

Chen, et al., "Analysis and design of asymmetrical half bridge flyback converter," IEE Proc.-Electr. Power Appl., vol. 149, No. 6, Nov. 2002.

(Continued)

*Primary Examiner* — Jue Zhang
(74) *Attorney, Agent, or Firm* — Blank Rome LLP

(57) ABSTRACT

A primary resonant flyback converter may include a primary winding, a resonant capacitor in series with the primary winding, a secondary winding magnetically coupled to the primary winding, and an output electrically coupled to the secondary winding. A main switch may be operated to energize the primary winding when closed and transfer energy stored in the primary winding to the secondary winding when open. An auxiliary switch may be configured to switch complimentarily to the main switch, thereby allowing a resonant current to circulate through the primary winding and capacitor. Switch timing may be controlled to produce a desired output voltage. The switching frequency may be varied as a function of output load, input voltage and/or voltage ripple on a DC bus of the converter. Switching may also be temporarily disabled responsive to a decrease in output load and re-enabled responsive to an increase in output load.

20 Claims, 19 Drawing Sheets

(56) References Cited

U.S. PATENT DOCUMENTS

| | | |
|---|---|---|
| 8,211,567 B2 | 7/2012 | Hori |
| 8,503,199 B1 | 8/2013 | Chapuis |
| 8,568,915 B2 | 10/2013 | Fuhr |
| 9,144,451 B2 | 9/2015 | Schall |
| 9,467,054 B2 | 10/2016 | Dai |
| 9,490,079 B2 | 11/2016 | So |
| 9,768,700 B2 | 9/2017 | Oh |
| 2005/0048365 A1 | 3/2005 | Miyahisa |
| 2009/0290384 A1 | 11/2009 | Jungreis |
| 2013/0329470 A1* | 12/2013 | Stroppa ............... H02M 3/3376 363/21.17 |
| 2014/0117878 A1 | 5/2014 | Prodic |
| 2014/0140113 A1 | 5/2014 | Oh |
| 2014/0368167 A1 | 12/2014 | Okura |
| 2015/0194897 A1 | 7/2015 | Kim |
| 2016/0343997 A1 | 11/2016 | Sekiya |
| 2017/0040903 A1 | 2/2017 | Chen |
| 2017/0141689 A1 | 5/2017 | Hatano |

OTHER PUBLICATIONS

Domenico, Francesco Di, "600W LLC Demo Board," Infineon Technologies AG, 2014.

Han, et al., "Analysis and Measurement of Resonant Tank Current on LLC," Texas Instruments, SLUA690, Jul. 2013.

Lee, et al., "High-Efficiency Asymmetric Forward-Flyback Converter for Wide Output Power Range," IEEE Transactions on Power Electronics, vol. 32, No. 1, Jan. 2017.

Texas Instruments, "A 90-W, High-Efficiency, LLLC Series-Resonant Converter with Secondary-Side Synchronous Rectification," SLUU467, Dec. 2010.

\* cited by examiner

VARIABLE FREQUENCY AND BURST MODE OPERATION OF PRIMARY RESONANT FLYBACK CONVERTERS

CROSS-REFERENCE TO RELATED APPLICATIONS

This application claims priority to U.S. Provisional Application No. 62/538,135, filed Jul. 28, 2017, entitled "Primary Resonant Flyback Converters," by InHwan Oh, et al., U.S. Provisional Application No. 62/538,146, filed Jul. 28, 2017, entitled Primary Resonant Flyback Converters," by InHwan Oh, and U.S. Provisional Application No. 62/538,156, filed Jul. 28, 2017, entitled "Primary Resonant Flyback Converters," by InHwan Oh, et al., all of which are incorporated by reference herein in their entireties.

BACKGROUND

Conventional flyback converters are widely used to convert a high voltage AC input (e.g., 90 $V_{AC}$ to 265 $V_{AC}$) to a low voltage DC output (e.g., 5 $V_{DC}$ to 20 $V_{DC}$) because they are simple circuits and may be constructed inexpensively due to a relatively low number of components. One drawback to conventional flyback converters is that the power conversion efficiency is typically around 80~85% for 20 W output power range. Significant sources of power loss in conventional flyback converters include switching losses caused by activating the switching components when both voltage and current are high. Another disadvantage of conventional flyback converters, in at least some embodiments, is that the primary and secondary side current waveforms are saw tooth type, which include high frequency harmonics. Thus, it may be desirable to provide improved flyback converters that reduce these switching losses and harmonic components as well as providing other beneficial characteristics.

SUMMARY

A primary resonant flyback converter may include a primary winding and a secondary winding magnetically coupled thereto, with an output of the converter being electrically coupled to the secondary winding via a rectifier. The power converter may also include a resonant capacitor in series with the primary winding. A main switch may be configured to switch so that when closed the main switch energizes the primary winding and resonant capacitor from a DC voltage bus and when open the energy stored in the primary winding and resonant capacitor is transferred to the secondary winding. The converter may also include an auxiliary switch configured to switch on during an off time of the main switch and switch off during an on time of the main switch, thereby allowing a resonant current to circulate through the primary winding and the resonant capacitor. The timing of switching of the main (and auxiliary) switch(es) may be altered to produce a desired voltage at the output of the power converter.

In various configurations, the switches may be operated such that a duty cycle of the main switch and auxiliary switch is varied to produce a desired output voltage, while a switching frequency of the main switch and auxiliary switch is varied as a function of output load on the converter or input voltage into the converter. The switching frequency may be increased in response to a decrease in output load and/or may be varied to maintain a constant ratio between input voltage and switching frequency. The switches may also be operated such that the switching frequency is varied as a function of voltage ripple on a DC bus of the converter. In some configurations, switching of the main and auxiliary switches may be temporarily disabled responsive to a decrease in output load and re-enabled responsive to an increase in output load.

DETAILED DESCRIPTION

Figure 1:
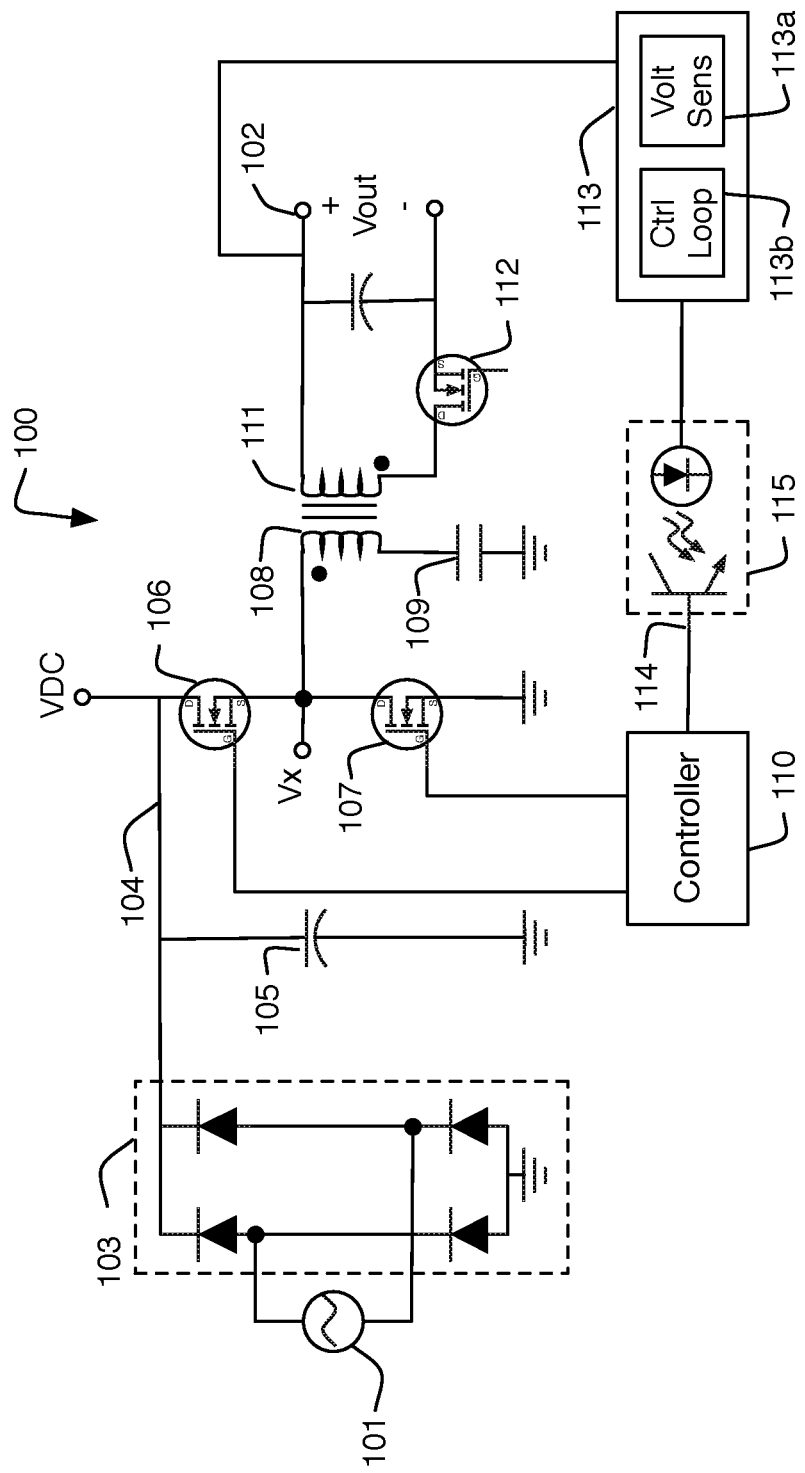
FIG. 1 illustrates a schematic diagram of a primary resonant flyback converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

I. Primary Resonant Flyback Converter Topology

Disclosed herein are a variety of power converter embodiments based on the primary resonant flyback converter topology. Primary resonant flyback converters are also known as asymmetric flyback converters or resonant flyback converters. One characteristic of a primary resonant flyback converter topology is a flyback mode of operation, meaning that energy is stored in the magnetic component during a first portion of the switching cycle and then transferred to the load during a second portion of the switching cycle (as will be described in greater detail below). An additional characteristic is that the primary side of the circuit resonates, as described in greater detail below. Advantages of the primary resonant flyback converter over conventional flyback converters include zero voltage switching, which leads to increased operating efficiency, and quasi-sinusoidal secondary current, which leads to reduced EMI and harmonic content. These advantages, including the increase in efficiency, can allow for higher power density, smaller form factors, and lower temperature stresses on the various components of the converter.

An exemplary primary resonant flyback converter 100 implemented using this topology is illustrated in FIG. 1. More specifically, converter 100 is a half bridge primary resonant flyback converter. (Full bridge primary resonant flyback converters are described below.) Converter 100 converts high voltage alternating current (AC) electricity, delivered from input power source 101 (such as 110V AC power mains in the US or 220 V AC power mains in Europe), to a lower direct current (DC) voltage suitable for delivery to a load (not shown). The load may include such electronic devices as a personal computer, notebook computer, tablet computer, smart phone, peripheral for one of the foregoing, etc.). The low voltage DC electricity can be delivered to the load via output terminal 102.

Full bridge rectifier 103 at the input of converter 100 receives the AC input power and converts it to a DC voltage that is delivered to a DC voltage bus 104. Although a full bridge rectifier made up of four diodes is illustrated, other rectifier topologies could also be used. Examples of such rectifier topologies can include various full bridge or half bridge circuits made up of diodes, silicon controlled rectifiers (SCRs), or transistor switching devices. In the illustrated embodiment, DC voltage bus 104 is supported by DC bus capacitor 105. The rectified input voltage thus charges input capacitor 105 to a DC voltage bus level $V_{DC}$.

The primary side of converter 100 includes two switching devices, a main switch 106 and an auxiliary switch 107, a primary coil 108, and a resonant capacitor 109. Main switch 106 has a first terminal coupled to DC voltage bus 104 and a second terminal coupled to a first terminal of auxiliary switch 107. A second terminal of auxiliary switch 107 is coupled to ground. Additionally, primary coil 108 has a first terminal coupled to the connection point of main switch 106 and auxiliary switch 107. Thus, the first terminal of primary coil 108 may be coupled to the DC voltage bus 104 by main switch 106 or may be coupled to ground by the auxiliary switch. A second terminal of primary coil 108 is coupled to a first terminal of resonant capacitor 109, which has its second terminal coupled to ground. A third terminal of main switching device 106 and a third terminal of auxiliary switching device 107 may be coupled to a controller 110, which can act as a driver to operate the switches to provide resonant flyback operation as described in further detail below.

In some embodiments, main switch 106 and auxiliary switch 107 may be implemented as metal-oxide semiconductor field effect transistors (MOSFETs). In other embodiments, other switching devices, such as junction field effect transistors (JFETs), bipolar junction transistors (BJTs), insulated gate bipolar transistors (IGBTs), etc. could also be used. Additionally, resonant capacitor 109 may have multiple functions, including being used with primary coil 108 to provide resonant operation and also serving as a DC current block to prevent continuous DC current flow through the circuit in the event of a failure of main switch 106. Such DC current flow could result in further damage, blown fuses or circuit breakers, etc.

The secondary side of converter 100 includes secondary coil 111 and rectifier 112. Secondary coil 111 is magnetically coupled to primary coil 108. Primary coil 108 and secondary coil 111 may be primary and secondary windings of a transformer or may be any other type of mutually coupled inductors. Rectifier 112 may be implemented in a variety of ways. In some embodiments, rectifier 112 may be simply a diode. In other embodiments, such as that illustrated in FIG. 1, rectifier 112 may be implemented as a synchronous rectifier. As alluded to above, the secondary side of converter 100 also includes output terminal 102, which delivers the converted low voltage DC electricity to the load.

In addition to the secondary coil 111 and rectifier 112, the secondary side of converter 100 may also include an output voltage sensing and control loop 113. As will be explained in greater detail below, this secondary side control loop is optional, and may be replaced by a primary side control loop. If secondary side control loop 113 is included, it will generally include voltage sensing circuitry 113a coupled to output terminal 102, which will allow sensing and control of the output voltage of converter 100. Voltage sensing circuitry 113a may be implemented by a variety of digital, analog, and/or hybrid (i.e., combined digital and analog) circuitry. This sensed output voltage will be input into a control loop 113b, which will implement a feedback signal 114 that is communicated to controller 110 for use in generating the drive signals for main switch 106 and auxiliary switch 107 (as described in greater detail below). In general, the controller will vary the switching frequency and/or switch on and switch off times to produce the desired output voltage. Control loop 113b may be implemented by a variety of digital, analog, and/or hybrid circuitry, including analog control loops, digital controllers, application specific integrated circuits (ASICs), and the like.

In some embodiments, control signal 114 will be communicated to controller 110 via an optocoupler 115, which allows for galvanic isolation between the primary and secondary sides. In some embodiments, rather than including voltage sensing circuitry 113a and control loop circuitry 113b on the secondary side, control loop circuitry 113b may instead be incorporated in controller 110 on the primary side, and the signal fed back controller 110 will instead be the sensed output voltage. In still other embodiments (described below), the output voltage may be sensed by controller 110 by sensing the reflected output voltage appearing across the resonant capacitor 109 on the primary side.

Generally, main switch 106 may be controlled using conventional peak current mode control with current regulated pulse width modulation. Auxiliary switch 107 may be driven complimentarily to main switch 106 (i.e., driven with the opposite signal of main switch 106, with some intervening dead time to prevent cross conduction). Both switches may be turned ON with a zero voltage switching condition where the switches' drain to source voltages become zero before a gate signal is applied. This results in zero turn on losses for the switches. Primary coil 108 may be excited when main switch 106 is on. If main switch 106 is off and auxiliary witch 107 is on, the primary side circuit (i.e., primary coil 108 and resonant capacitor 109) resonates with energy stored in the leakage inductance and magnetizing inductance of primary coil 108 during the excitation phase.

As a result of this resonance, energy stored in the leakage inductance is circulated, recycled, and delivered to the secondary side circuit. Because energy stored in the leakage inductance is not dissipated, efficiency of the circuit is improved. Voltage stresses on main switch 106 and auxiliary switch 107 are well clamped and limited by DC bus voltage 104 without any added snubber or clamping circuit. Thus, the primary side circuit does not require a snubber circuit (as used in conventional flyback converters) to clamp voltage spikes. Additionally, because the resonance takes place while auxiliary switch 107 is on, the secondary current waveform becomes quasi-sinusoidal, starting and ending smoothly, and thereby reducing electromagnetic interference and harmonic distortion.

Figure 2:
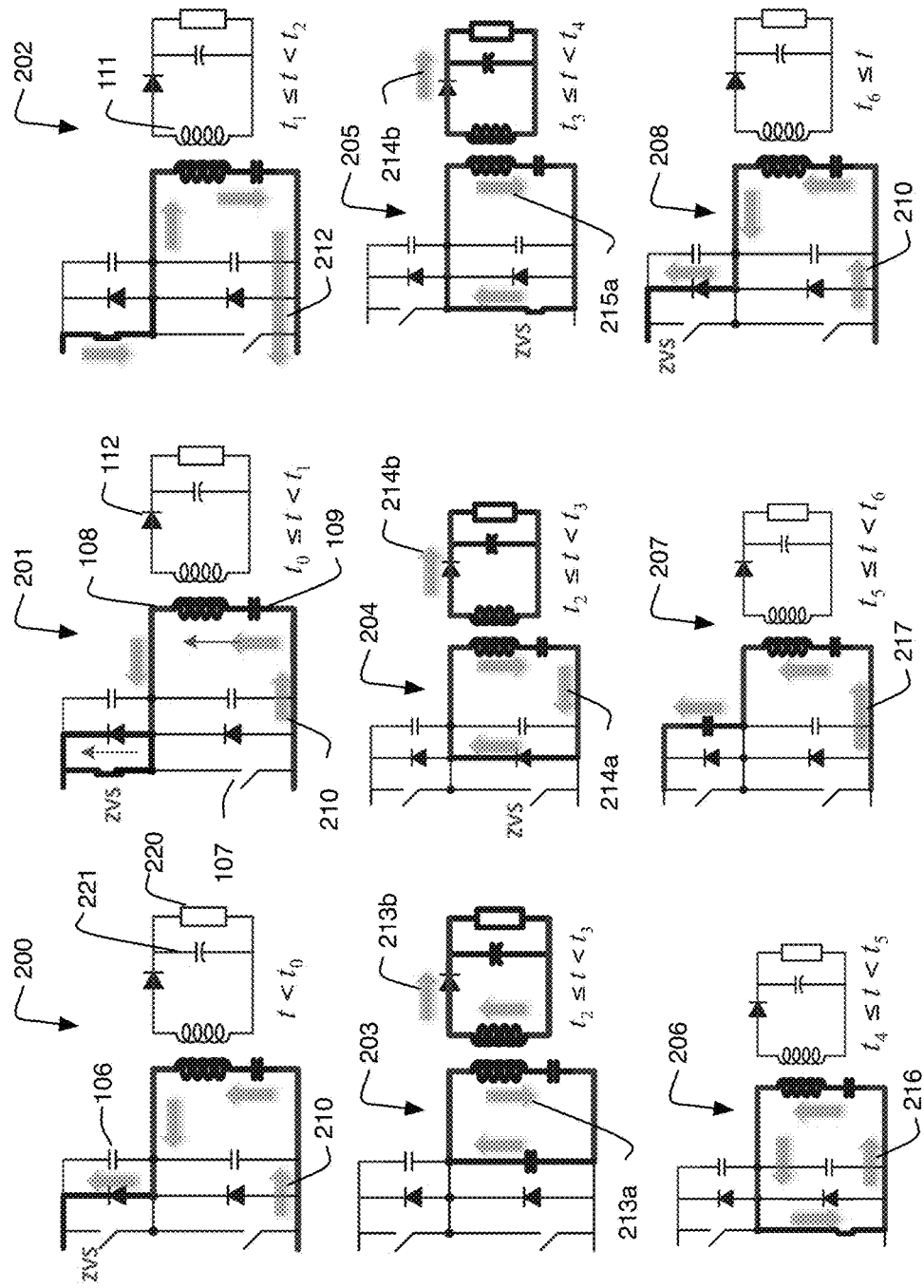
FIG. 2 illustrates a switching sequence of a primary resonant flyback converter.

FIG. 2 includes nine schematics 200-208 illustrating the switching sequence for primary resonant flyback converter operation of converter 100. Schematic 200 corresponds to the same state as 208, meaning that slightly more than one switching cycle is illustrated. In each of schematics 200-208, main switch 106 and auxiliary switch 108 are depicted as an equivalent circuit of a MOSFET, including an ideal switch, a body diode, and a drain to source parasitic capacitance coupled in parallel. Additionally, rectifier 112 is depicted as a diode (rather than a synchronous rectifier). Additionally each schematic depicts the load 220 and the output capacitance 221 of converter 100.

Figure 3:
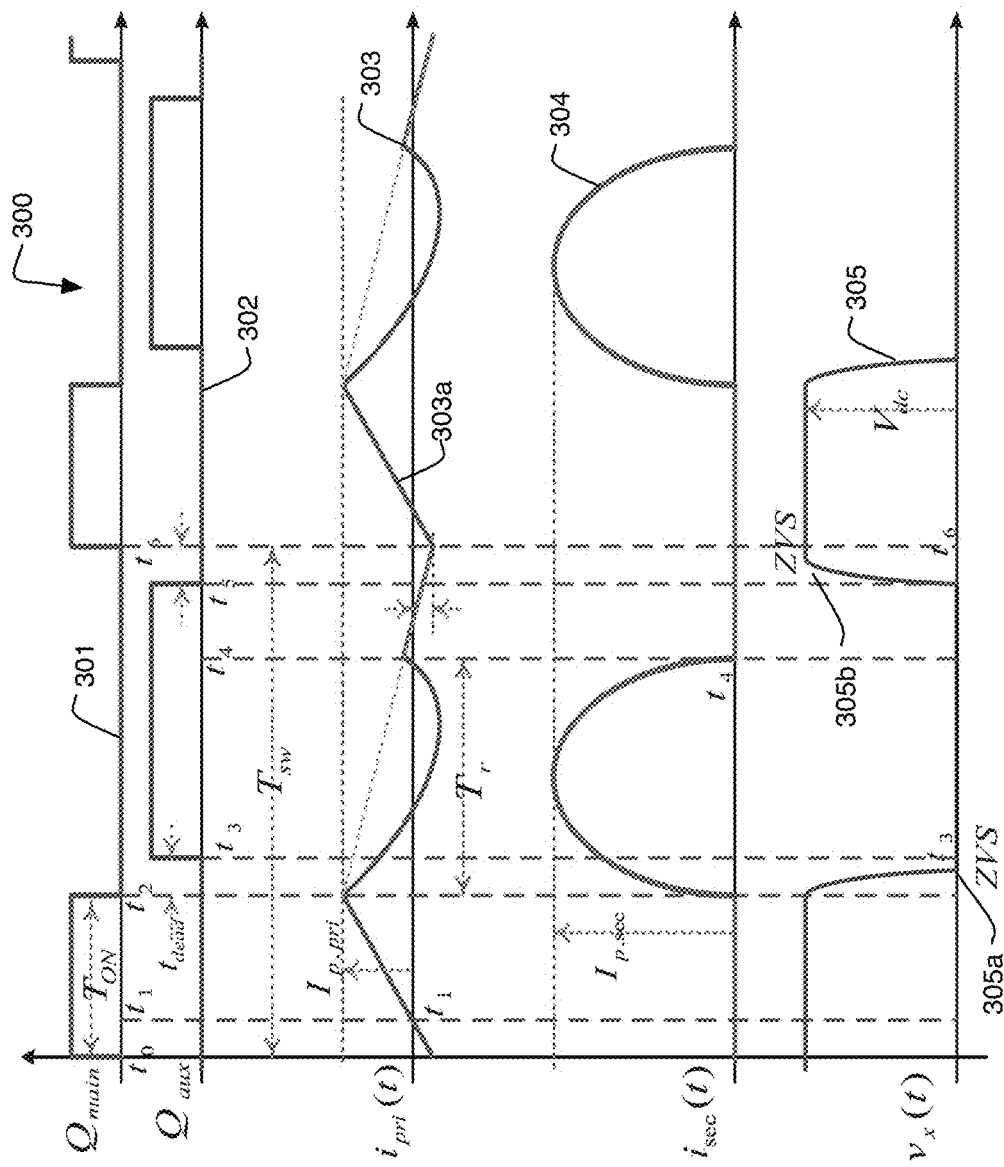
FIG. 3 illustrates selected waveforms of a primary resonant flyback converter.

Additionally, FIG. 3 depicts timing diagrams corresponding to the schematics depicted in FIG. 2. More specifically, FIG. 3 depicts gate drive signal 301 for main switch 106 and gate drive signal 302 for auxiliary switch 107. As will be discussed in greater detail below, main switch 106 turns on at time $t_0$ and off at time $t_2$. Auxiliary switch turns on at time $t_3$ and turns off at time $t_5$. Time $t_2$ (where main switch 106 turns off) and time $t_3$ (where auxiliary switch 107 turns on) are separated by a short dead time $t_{dead}$, which is interposed to prevent cross conduction. (Dead time $t_{dead}$ is discussed in further detail below.) After auxiliary switch 107 turns off at time $t_5$, and another short dead time, main switch 106 is turned on again at time $t_6$. The time period between successive turn on events for main switch 106 are a complete switching period or cycle $T_{sw}$. Also depicted in FIG. 3 are the primary current 303, the secondary current 304, and voltage 305 at the junction between main switch 106 and auxiliary switch 107, which may also be thought of as the voltage appearing across auxiliary switch 107.

Beginning at time $t_0$ in schematic 201, main switch 106 closes under zero voltage switching while primary current 210 is flowing in the indicated path. More specifically, current 210 is flowing from the ground side of converter 100, through series capacitance 109 and primary coil 108, through the body diode of main switch 106 to DC voltage bus 104. Because primary current 210 is flowing through the body diode of main switch 106, there is zero voltage across the main switch, which allows for zero voltage switching of the main switch. Zero voltage switching of the main switch results in decreased switching losses.

Beginning at time $t_1$, illustrated in schematic 202, main switch 106 has closed. This establishes a current path for primary current 212 from the DC voltage bus 104, through the main switch 106, through primary coil 106, through series capacitance 109, to ground. This primary current 212 causes energy to be stored in the magnetic field associated with primary coil 108 (and secondary coil 109).

At time $t_2$, main switch 106 is opened, as illustrated in schematic 203. Opening main switch 106 causes a circulating current 213a to flow on the primary side of converter 100. More specifically, even though main switch 106 has opened, the inductance of primary coil 108 tends to keep current flowing in the same direction. Thus, primary current 213a continues momentarily in the same direction as primary current 212, which discharges the parasitic capacitance associated with auxiliary switch 107. Additionally, secondary current 213b begins to flow through secondary coil 111, through rectifier 112, beginning the cycle of delivering energy stored in the magnetic field associated with primary coil 108 and secondary coil 111 to load 220. Very shortly thereafter, when the parasitic capacitance of auxiliary switch 107 is discharged, the body diode associated with auxiliary switch 107 becomes forward biased, allowing circulating primary current 214a to flow through the body diode as illustrated in schematic 204. During this time, secondary current 214b continues to flow, continuing delivery of the energy stored in the magnetic fields of primary coil 108 and secondary coil 111 to load 220.

At time $t_3$, illustrated in schematic 205, auxiliary switch 107 closes under zero voltage switching. Zero voltage switching is possible because the circulating current 214a through the body diode of auxiliary switch 107 (illustrated in schematic 204) results in zero voltage across auxiliary switch 107. Thus, as illustrated in schematic 205, circulating primary current 215a flows through main switch 107, primary coil 108, and series capacitance 109. During this time, secondary current 215b continues to flow as described above.

Primary coil 108 and series capacitance 109 form a series resonant circuit. The series resonance will cause primary circulating current 215a to reverse direction at time $t_4$, thereby becoming primary reverse circulating current 216 illustrated in schematic 206.

As illustrated in schematic 207, at time $t_5$, once the energy stored in the magnetic field associated with primary coil 108 and secondary coil 111 has been delivered to load 220, auxiliary switch opens. Although auxiliary switch 107 has opened, the inductance of primary coil 108 tends to keep current flowing in the same direction, thus current 217 is established, which discharges the parasitic capacitance of main switch 106. Very shortly thereafter, at time $t_6$, the body diode of main switch 106 becomes forward biased, as illustrated in schematic 208. (Note that schematic 208 and schematic 200 depict the same switching stage.) Current 210 flowing through the body diode of main switch 106 allows for main switch 106 to close under zero voltage switching, and the cycle repeats again beginning with time $t_0$ illustrated in schematic 201.

Because the operations described above all achieve zero voltage switching of main switch 106 and auxiliary switch 107, there are no turn on switching losses associated with the operation of converter 100. Because switching losses are generally proportional to the frequency of the switching operation, this allows the converter to be operated at higher frequencies without undesirably increasing losses.

Turning back to FIG. 3, it can be appreciated that main switch 106 is the primary control device for converter 100. The longer the on time Ton of main switch 106 (i.e., the longer the interval between main switch 106 turn on at time t0 and turn off at time t2), the more energy will be stored in the magnetic field associated with primary coil 108 and secondary coil 111. Conversely, auxiliary switch 107 is a freewheeling and recirculating switch that allows resonant operation of the primary side. Auxiliary switch 107 has a duty cycle that is the complement of the duty cycle of main switch 106. In other words, when main switch 106 is on, auxiliary switch 107 is off, and vice-versa (less the dead times provided between turning off one switch and turning on the other to prevent cross conduction, shorting out the DC bus, and causing damage to the circuitry or other components).

The dead time required between switching events ($t_{dead}$) will generally be a function of the amount of time required to charge the parasitic capacitances associated with the main and auxiliary switches. Thus, for embodiments in which main switch 106 and auxiliary switch 107 are MOSFETs, the drain to source capacitance $C_{DS}$ with drive the dead time. In general, devices having higher current ratings will also have wider channels (to reduce the drain to source resistance $R_{DS}$), which increases $C_{DS}$. Additionally, devices having higher voltage handling will require longer transition times (and thus longer dead times). Because the circuit must be able to transfer all energy stored the magnetic field during main switch 106's on time to the secondary during the main switch's off time, the duty cycle of auxiliary switch 107 will, in some embodiments, be longer than the duty cycle of main switch 106. This may result in auxiliary switch 107 being a physically larger switch, and thus having a higher associated capacitance. Additionally, As a result, the dead time $t_{dead}$ may be selected as a function of the parasitic capacitance associated with auxiliary switch 107.

With further reference to FIG. 3, one advantageous aspect of the primary resonant flyback converter may be seen. Secondary current 304, which is the current flowing from secondary coil 111 to load 220 is substantially sinusoidal. This is in contrast to conventional flyback converters, in which the secondary current has a triangular shape. Having a sinusoidal secondary current decreases higher harmonics of the primary switching frequency, and therefore reduces the amount of electromagnetic interference (EMI) that must be otherwise dealt with in the system. Reduced EMI may be advantageous when converter 100 used with certain types of systems, for example, those that employ capacitive touch sensors. Such capacitive touch sensing systems sometimes operate with frequencies that are in the same general range as the switching frequency of power supplies, and the resulting EMI can interfere with their operation. The sinusoidal secondary current 304 depicted in FIG. 3 can therefore improve the operation of such systems.

Additionally, implementation of zero voltage switching (as discussed above) may improve the noise and EMI performance of power supply 100. Voltage waveform 305 depicts the voltage at the junction of main switch 106 and auxiliary switch 107, i.e., the voltage applied to the input of primary coil 108. As can be seen at points 305a and 305b, implementation of zero voltage switching smoothens out the transition from high voltage to low and low voltage to high as applied to primary coil 108. Elimination of voltage spikes at these transitions can improve EMI performance of the circuit, because primary coil 108 and secondary coil 111 can act as antennas for EMI.

Figure 4:
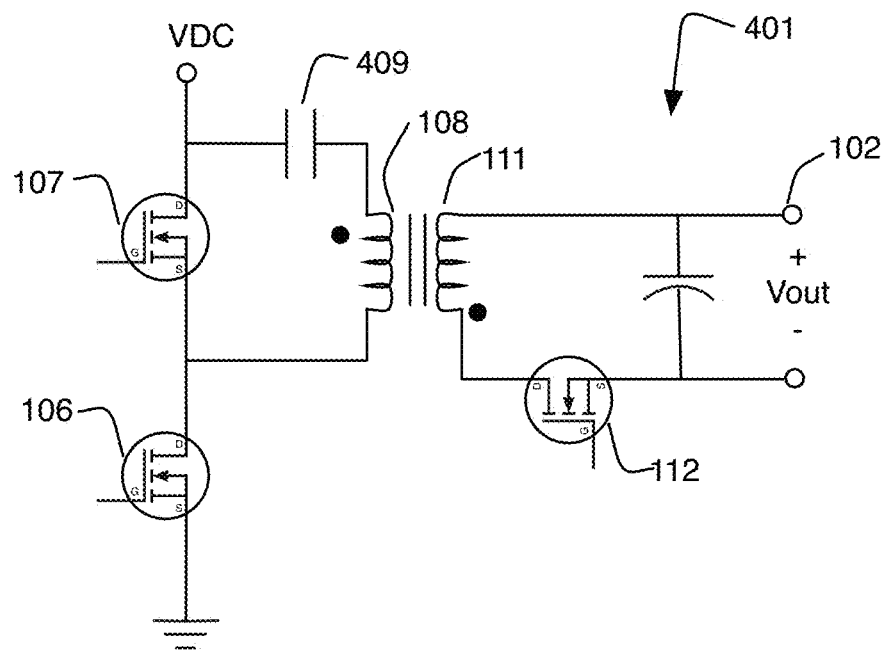
FIG. 4 illustrates two alternative schematic diagrams of primary resonant flyback converters.
Figure 4:
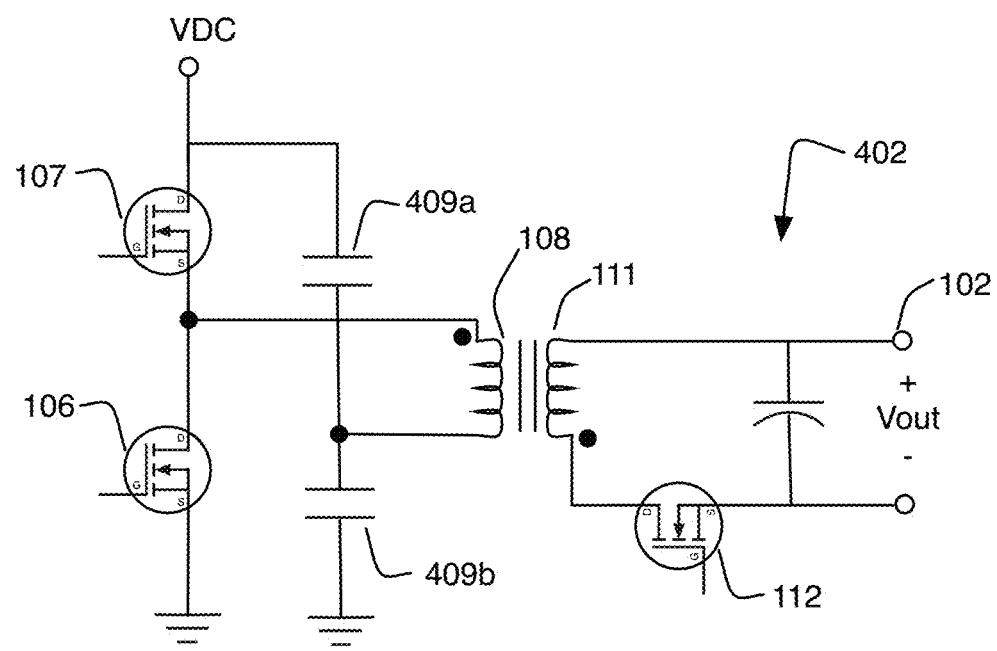

FIG. 4 illustrates two alternative embodiments of primary resonant flyback converters employing minor circuit topology differences. In circuit 401, resonant capacitor 409 has been relocated so as to be coupled between the DC bus 104 and primary winding 108. Additionally, main switch 106 and 107 have been reversed with respect to DC bus 104 and ground. The switching schemes described herein function substantially similarly in this embodiment, and the sequence of operation is generally as described with reference to FIG. 2, the only difference is the sequence of components with respect to DC bus 104 and ground.

Circuit 402 represents a further variation in which the resonant capacitor has been split into two separate capacitors 409a and 409b forming a half bridge with respect to DC bus 104 and ground. Primary coil 108 is coupled between the junction point of the half bridge formed by main switch 106 and auxiliary switch 107 (as described above) and the junction point of the half bridge formed by the resonant capacitors 409a and 409b. As above, the switching scheme of main and auxiliary switches 106 and 107 remains generally as described.

One further advantage of the primary resonant flyback converter topology described above is improved efficiency. In some embodiments, efficiency may be improved from around 88% using a conventional flyback topology to around 96% for a primary resonant flyback converter. This efficiency improvement may afford a number of advantages beyond reduced power consumption. For example, improving the efficiency may reduce the thermal load associated with main switch 106 and/or auxiliary switch 107 to a value sufficiently low that they may be integrated into a single physical package with controller 110. This can improve both the cost of systems implemented in this way, as well as reducing the physical footprint (i.e., size) of the system.

II. Full Bridge Primary Resonant Flyback Converter

The half bridge primary resonant flyback converters described above can have improved power conversion efficiency because of their incorporation of zero voltage switching. However, to incorporate zero voltage switching, the range of suitable inductance values for primary coil 108 is limited. In some cases, to accommodate zero voltage switching in a primary resonant flyback converter, the inductance of primary coil 108 may be fairly low as compared to the corresponding primary coil inductance value in a conventional discontinuous conduction mode flyback converter. As a result of this lower inductance value, the impedance of primary coil 108 will be lower (at any given frequency), which may result in undesirably high magnetizing currents, particularly at higher voltage levels. This high magnetizing current may be addressed in part by increasing the frequency of operation at higher voltages (as discussed in greater detail below), but another solution may be desirable in some embodiments.

In some embodiments, half bridge primary resonant flyback converters may have other disadvantages as well. For example, the voltage of DC bus 104 must be divided across primary coil 108 and resonant capacitor 109. As a result, the power conversion gain will always be less than one for a half bridge primary resonant flyback converter. The voltage across resonant capacitor 109 will be equal to the voltage of DC bus 104 times the switching duty cycle of main switch 106. As a result, the turns ratio between primary coil 108 and secondary coil 111 (i.e., $N_p/N_s$) may also be constrained to a relatively small value. In some operating conditions, this may result in high voltage stress on the synchronous rectifier 112. Additionally, the duty cycle of main switch 106 in a half bridge primary resonant flyback converter is limited to 50% because the energy stored in the transformer is only transferred during the off time of main switch 106 (i.e., the converter is in flyback operation). Beyond a 50% duty cycle for main switch 106, power conversion gain of the converter will actually be decreasing.

These issues may be mitigated in some embodiments by employing a full bridge primary resonant flyback converter. By switching the input stage to a full-bridge configuration, the power conversion gain can be higher than one because the transformer voltage can be positive or negative with respect to the voltage of DC bus 104. As a result, the turns ratio can be increased thereby reducing voltage stress on the output synchronous rectifier 112, which allows lower voltage rated synchronous rectifiers to be used, providing increased efficiency. Also, because the power conversion gain can be greater than one, the duty cycle of the main switches may be decreased relative to that of a half bridge delivering the same power. Because of the foregoing, the inductance of primary coil 108 may be increased, increasing the associated magnetizing impedance and decreasing the magnetizing currents. Reducing the magnetizing currents can also reduce circulating current losses on the primary size and allow the use of a physically smaller transformer (or mutually coupled primary and secondary coils).

Figure 5:
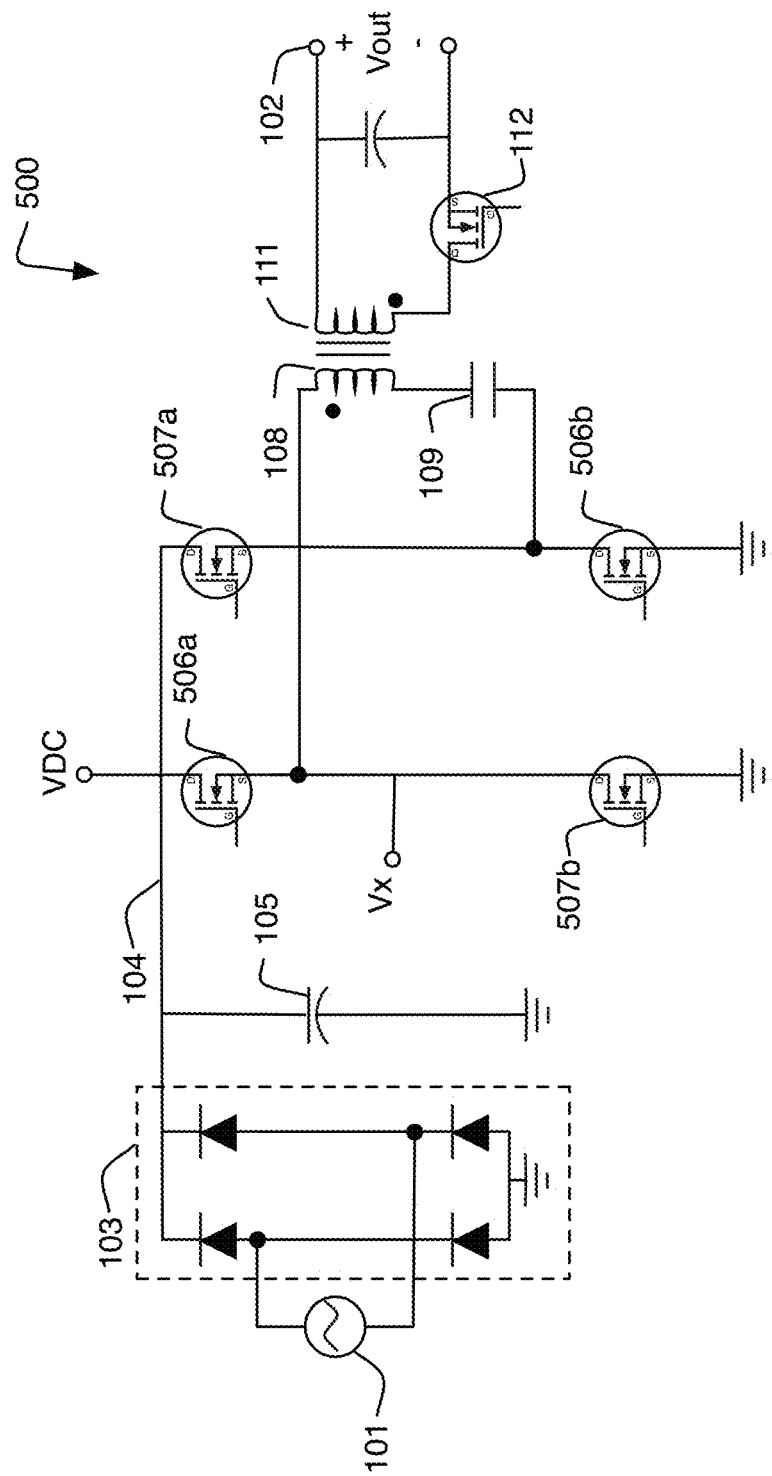
FIG. 5 illustrates a schematic diagram of a full bridge primary resonant flyback converter.

An exemplary full bridge primary resonant flyback converter 500 is illustrated in FIG. 5. Voltage and current sensing circuits and control circuits have been omitted for clarity. However, any of the various sensing and control circuits discussed herein may be employed. As can be seen, the full bridge primary resonant flyback converter 500 uses four switching devices: high side main switch 506a, low side main switch 506b, high side auxiliary switch 507a, and low side auxiliary switch 507b. Primary coil 108 and resonant capacitor 109 are series coupled between the junction point of high side main switch 506a and low side auxiliary switch 506b and the junction point of high side auxiliary switch 507a and low side main switch 506b.

Main switches 506a and 506b are switched together, and may be operated according to any of the switching schemes described herein. It will be appreciated that the on time of the main switches can be lower while still delivering the same amount of power as a half bridge primary resonant flyback converter. Auxiliary switches 507a and 507b are switched together and are switched oppositely with respect to main switches 506a and 506b. As discussed elsewhere herein, there may be a suitable dead time between switching off the main switches and switching on the auxiliary switches (and vice versa) to prevent cross conduction.

In some embodiments, operation as either a full bridge or half bridge primary resonant converter may be selected when using the topology illustrated in FIG. 5. For example, full bridge or half bridge operation may be selected in response to the voltage of DC bus 104. In the case of a higher DC bus voltage, a lower conversion gain is required, and half bridge operation may be selected. Conversely, in the case of a lower DC bus voltage, a higher conversion gain is required, and full bridge operation may be selected. This can allow operation of the converter without the extreme range of duty cycles that would otherwise be required to accommodate a wide input voltage range. To configure the converter illustrated in FIG. 5 as a half bridge primary resonant converter, switch 507a may be turned off (opened) while switch 506b is turned on (closed). In that case, switch 506a may be operated as the main switch, and switch 507b may be controlled as the auxiliary switch. (It will be appreciated that, in this arrangement, the circuit illustrated in FIG. 5 becomes substantially equivalent to the circuit illustrated in FIG. 1, and operation is as described above.)

III. Primary Side Control

As discussed above with respect to FIG. 1, flyback converters may be implemented with output voltage sensing and output voltage control performed on the secondary side of the converter. For example, as illustrated in FIG. 1, converter 100 has output voltage and control loop 113 located on the secondary side of converter 100. This requires an optocoupler 115 to provide feedback signal 114 to controller 110. Controller 110 can use feedback signal 114 to generate the drive signals for main switch 106 and auxiliary switch 107. Even if output voltage control loop 113b is implemented as part of controller 110 (i.e., implemented on the primary side of the controller), the output voltage feedback signal 114 is still required, which requires optocoupler 115 so that galvanic isolation is provided between primary and secondary. In some embodiments, it may be desirable to perform all output voltage sensing and output voltage control on the primary side of the controller. So doing can facilitate elimination of optocoupler 115 as well as all sensing circuitry on the secondary side. This can provide a number of advantages, including reduced size, reduced cost, improved reliability. Additionally, system design may be simplified by eliminating the need to design around the optocoupler's non-linear current transfer ratios and temperature dependencies.

Figure 6:
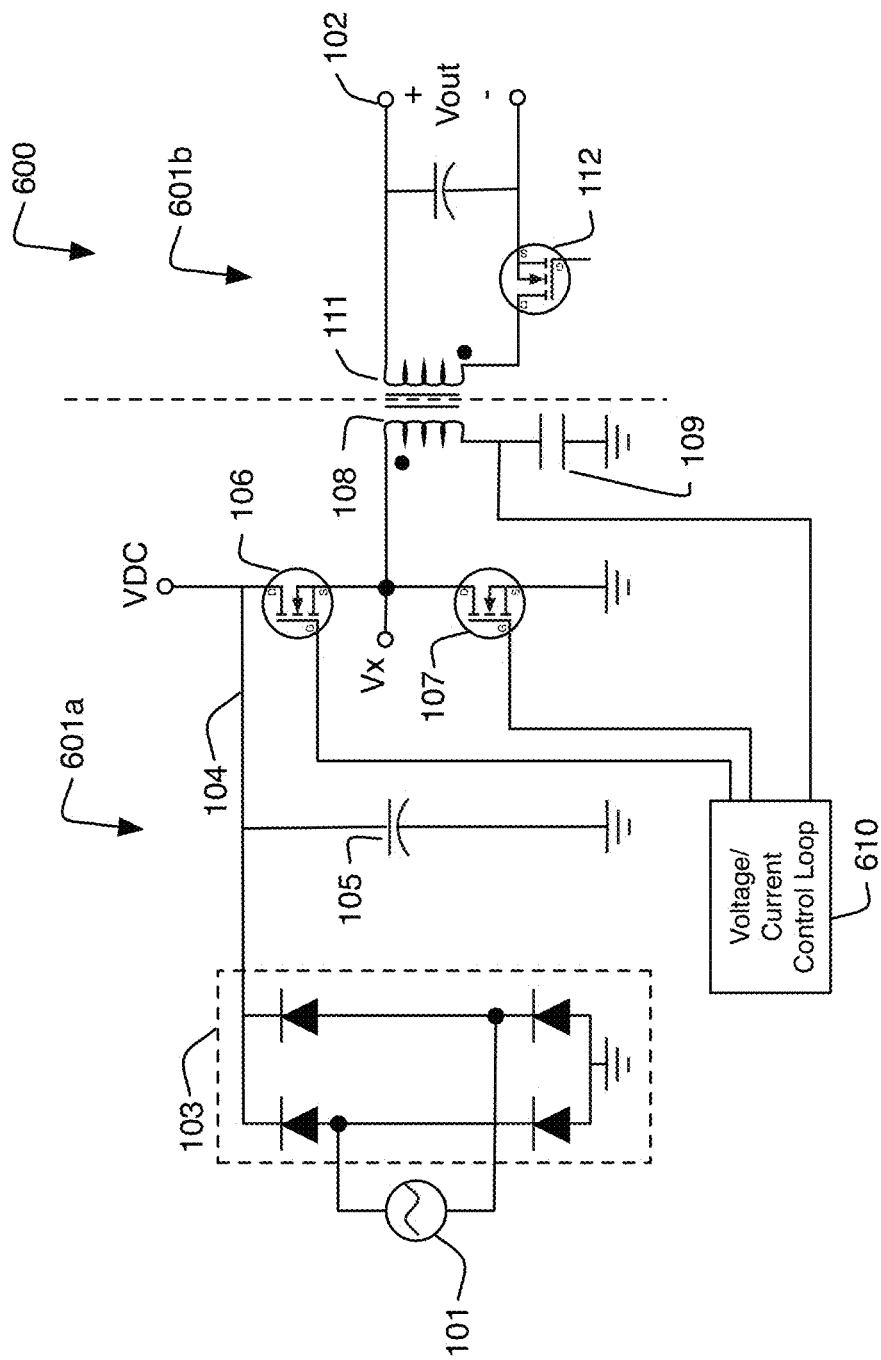
FIG. 6 illustrates a schematic diagram of a primary resonant flyback converter with primary side voltage sensing and control.

FIG. 6 illustrates a primary resonant flyback converter 600 featuring primary side control. Primary side 601a of converter 600 includes primary coil 108 and all components electrically connected thereto, including main switch 106, auxiliary switch 107, resonant capacitor 109, DC voltage bus 104 supported by capacitor 105, rectifier 103, and AC voltage input 101. Secondary side 601b or converter 600 includes secondary coil 111, synchronous rectifier 112, and output terminal 102 for supplying a regulated DC voltage to a load (not shown). Each of these components operate generally as described above with respect to FIG. 1. Further, as discussed above, primary coil 108 may be the primary winding of a transformer, or may be a mutual inductor magnetically coupled to secondary coil 111.

As can be seen with reference to FIG. 6, a significant distinction between primary side controlled primary resonant flyback converter 600 and the primary resonant flyback converter 100 illustrated in FIG. 1 is the absence of output voltage and control loop 113 from secondary side 601b of controller 600, as well as the optocoupler required to couple its signal to controller 110 on the secondary side. Instead, converter 600 implements all control of the converter in voltage/current control loop 610, which is located on primary side 601a of converter 600. To do so, voltage/current control loop 610 can obtain output voltage (and also output current) information from resonant capacitor 109. (The following discussion describes obtaining information about the output voltage presented at output terminal 102 from resonant capacitor 109. Current sensing techniques are described in greater detail below.)

Figure 7:
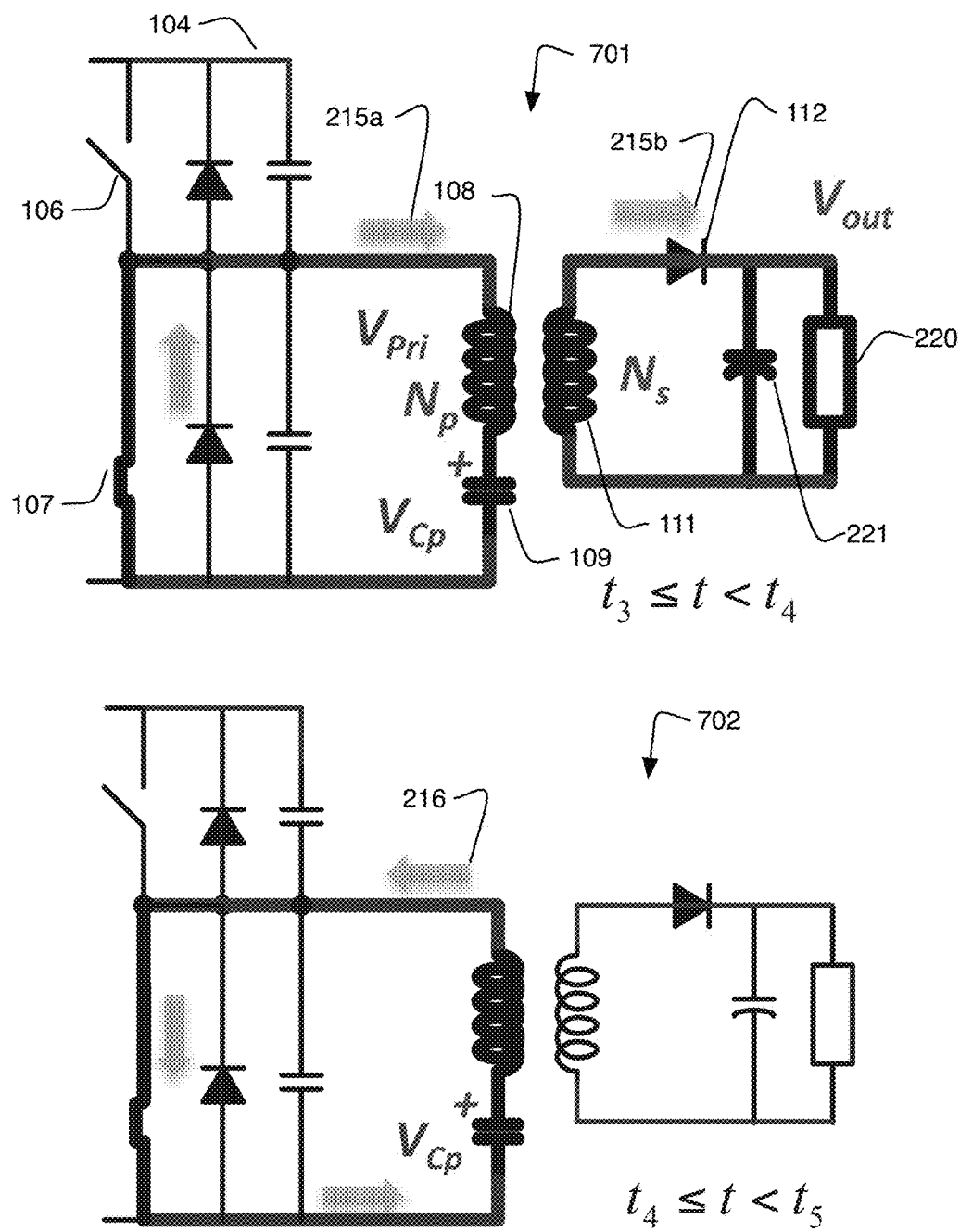
FIG. 7 illustrates two stages of the switching cycle associated with primary side voltage sensing in a primary resonant flyback converter.

FIG. 7 depicts two equivalent circuit schematics 701 and 702 corresponding to two portions of the switching cycle for converter 600. More specifically, schematic 701 depicts the time interval between t3 and t4, during which auxiliary switch 107 closes under zero voltage switching while its body diode is conducting resonating primary side current 215a in the forward direction through primary coil 108. This time interval and associated operations correspond to that described above with respect to schematic 205 in FIG. 2. Schematic 702 depicts the time interval between $t_4$ and $t_5$, during which auxiliary switch 107 is closed and conducting resonating primary side current in the reverse direction through primary coil 108. This time interval and associated operations correspond to that described above with respect to schematic 206 in FIG. 2.

As seen in FIG. 7, because the voltage drop across auxiliary switch 107 is negligible, the voltage across the primary coil 108 is equal to the voltage across resonant capacitor 109. Additionally, the ratio between the voltage across primary coil 108 and the voltage across secondary coil 111 is equal to the ratio of the numbers of turns in the respective coils. Thus, the voltage across the resonant capacitor VCP is proportional to the output voltage, with the constant of proportionality being the turns ratio. In other words:

$$V_{CP} = -\frac{N_P}{N_S}V_{out}$$

where $V_{CP}$ is the voltage across resonant capacitor 109, $N_S$ is the number of turns in secondary coil 111, $N_P$ is the number of turns in primary coil 108, and $V_{out}$ is the output voltage.

It will be appreciated that the output voltage $V_{out}$ is not exactly equal to the voltage across secondary winding 111 because there is some voltage drop across rectifier 112. However, in practice, this voltage drop is small, and may be ignored in some cases. For example, slight variations in output voltage regulation that occur due to the drop across rectifier 112 may be sufficiently small as to not materially affect operation of the circuit as a battery charger. Also, it will be appreciated that the error associated with neglecting the voltage drop across rectifier 112 is larger when the output load current is high and smaller when the output load current is low.

Instead of neglecting the voltage drop across rectifier 112, known characteristics of rectifier 112 may be used to offset the sensed capacitor voltage. For example, a conventional diode might have a one voltage drop, while a Schottky diode might have a lower drop, and a synchronous rectifier may have a still lower voltage drop, all of which will be known to the system designer. The interface circuitry between resonant capacitor 109 and voltage/current control loop may be designed accordingly to provide for these offsets, or voltage/current control loop 610 may be altered to account for this information. The alternation may be accomplished by appropriate design of the input circuitry, or, if voltage/current control loop is a digital or hybrid digital/analog controller, the digital portion of the control loop may be adjusted accordingly. Alternatively or additionally, secondary side current information may be further used to refine control of the output voltage based on the sensed voltage across capacitor.

Thus, as illustrated in FIG. 6, voltage/current control loop 610 may use as an input the voltage across resonant capacitor 109, which is directly proportional to the output voltage. Voltage/current control loop 610 may be based on analog circuitry, digital circuitry, hybrid circuitry, etc. In addition to sensing and regulating the output voltage by adjusting the timing and frequency of gate drive signals for main switch 106 and auxiliary switch 107, voltage/current control loop 610 may also sense and regulate output current as described in greater detail below.

In states other than those illustrated in schematics 701 and 702, the instantaneous voltage across resonant capacitor 109 will not be directly related to the output voltage. However, the average voltage across resonant capacitor 109 will be proportional to the output voltage. For output voltage sensing during other states of the switching cycle (i.e., the other switching states described above with reference to FIG. 2), a low pass filter may be connected between resonant capacitor 109 and voltage/current control loop 610. Alternatively, a low pass input filter may be integrated with control loop 610. In either case, low pass filter may be implemented with analog circuitry, digital filtering, or a combination thereof. In all cases, this low pass filtered capacitor voltage may be used as a control input for output voltage control during the remaining portions of the switching cycle. Additionally, load voltage may also be sensed even more accurately by sampling the resonant capacitor voltage at specific timings.

In some embodiments, the design of converter 100 and voltage control loop 610 may be such that the bandwidth of the overall system is on the order of 1-10 kHz. The voltage across resonant capacitor 109 will have a voltage ripple at the switching frequency of the main switch 106, which may be on the order of 100 kHz. Therefore, even after low pass filtering, the resultant capacitor voltage signal will still be sufficiently "fast" to not affect the dynamic response of voltage/current control loop 610, thereby allowing effective control of converter 100.

An additional advantage of sensing output voltage based on the voltage across resonant capacitor 109 arises when implementing output overvoltage protection control. In some conventional embodiments, output voltage is sensed on the secondary side and relayed via an optocoupler to the primary side switch driver, which can shut down the converter when an output overvoltage condition is detected. However, in cases in which the main voltage control loop resides on the secondary side, an error signal is sent back to the primary side, not the output voltage itself. Thus, sending additional voltage information requires another optocoupler, along with its associated cost, size, and reliability issues. Thus, sensing output voltage directly from the resonant capacitor 109 can also eliminate this additional component in some embodiments.

Figure 8:
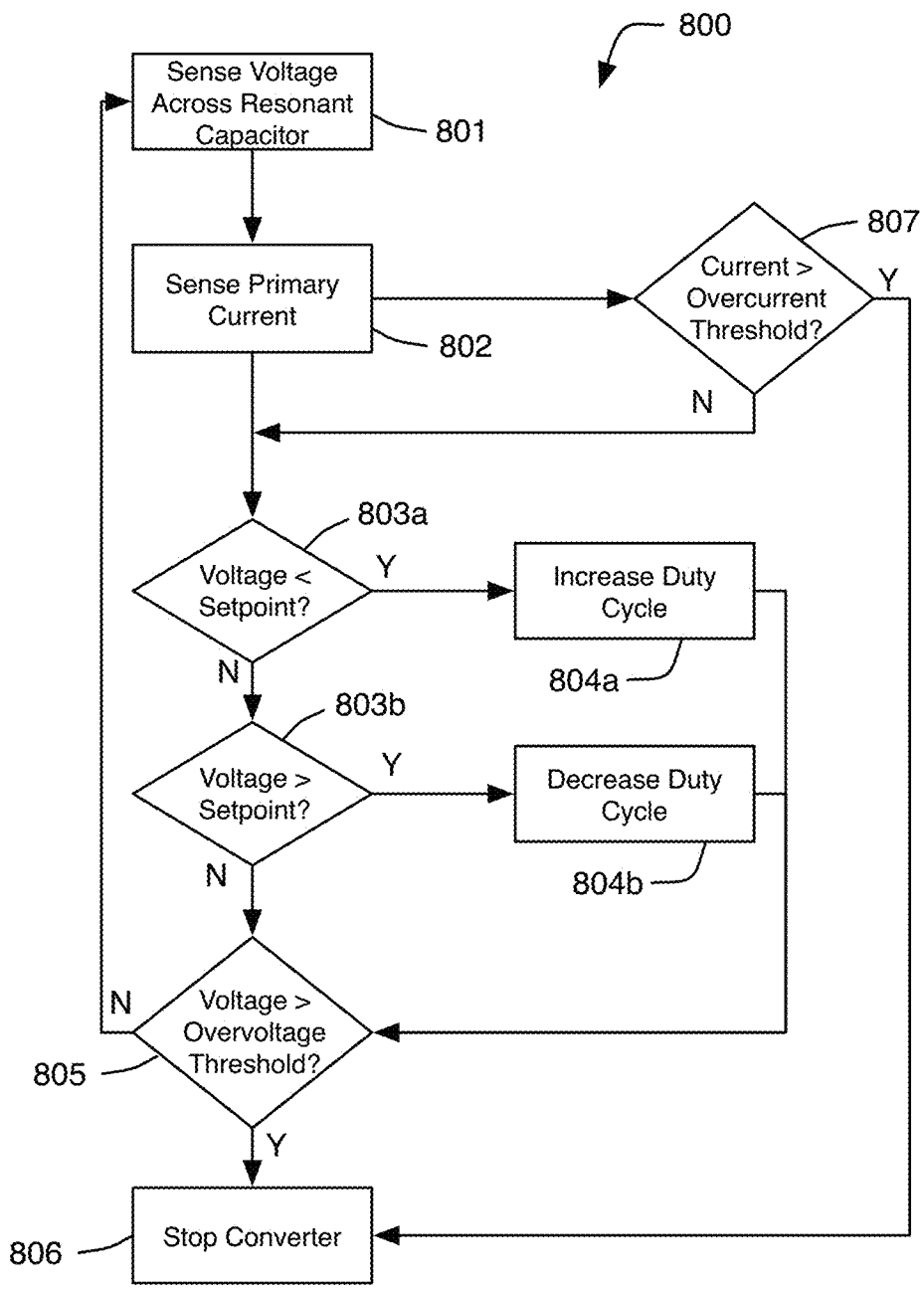
FIG. 8 illustrates a flowchart of a control algorithm for a primary resonant flyback converter.

FIG. 8 is a flow chart depicting a modified control scheme for a primary resonant flyback converter using the resonant capacitor 109 to sense the output voltage as described above. As discussed above, the control scheme may be implemented by controller 610 (FIG. 6) using analog, digital, or hybrid circuitry. The control process begins at 801 with sensing the voltage across the resonant capacitor. (Optional blocks 802 and 807 relate to the current sensing features discussed below may be disregarded.) The sensed voltage is then compared (803a; 803b) to the output voltage setpoint (i.e., the regulated output voltage of the converter). If the output voltage is less than the setpoint (meaning the output voltage is low), the duty cycle of the main switch is increased (804a). If the output voltage is greater than the setpoint (meaning the output voltage is high), the duty cycle of the main switch is decreased (804b). In either case, the sensed voltage is also compared to an overvoltage threshold (805). If the output voltage is beyond the overvoltage threshold (indicating some sort of malfunction), the converter is stopped (806). Otherwise, the process repeats with continued sensing of the output voltage (802).

IV. Lossless Current Sensing

Figure 9:
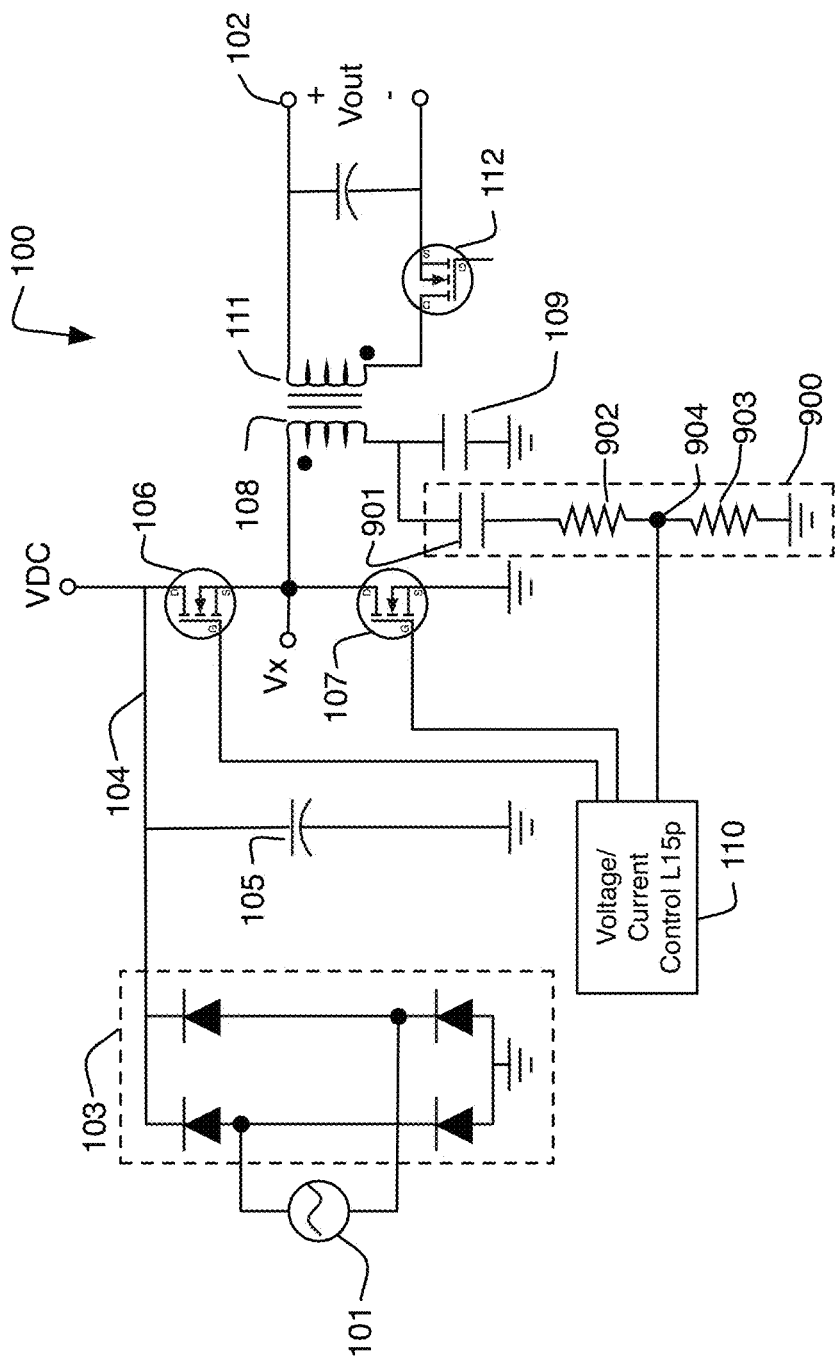
FIG. 9 illustrates a primary resonant flyback converter with lossless current sensing on the primary side.

In addition to sensing the output voltage as described above, suitable control of converter 100 may require sensing one or more currents flowing through the converter. In some embodiments, the primary side current flowing through primary coil 108 and resonant capacitor 109 may be of interest. Conventional sensing techniques would use a sense resistor in series with the primary coil 108 and resonant capacitor 109. However, because the entire primary side current would be continuously flowing through such a resistor, overall efficiency of the converter would be reduced. FIG. 9 illustrates an alternative current sensing arrangement that substantially reduces the losses associated with primary current side sensing.

Converter 100 illustrated in FIG. 9 can generally correspond to the various embodiments described elsewhere herein. Additionally, a current sense circuit 900 may be coupled in parallel with resonant capacitor 109. Current sense circuit 900 can include a current sense capacitor 901 and a voltage divider including resistors 902 and 903. Current sense capacitor 901 can have a relatively small capacitance compared to resonant capacitor 109. This ensures that only a small fraction of the primary current flows through current sense circuit 900. In some embodiments, the capacitance of 901 may be one tenth (1/10) the capacitance of resonant capacitor 109. In other embodiments, the capacitance of 901 may be even smaller, such as one one-thousandth (1/1000). The inventor has implemented a version of the circuit using a capacitance ratio of one six-hundredth (1/600). Selection of a ratio from this range for a given embodiment can be performed based on the particulars of the circuit's design and performance requirements.

Current sense circuit 900 also includes two very small resistors 902 and 903, which form a voltage divider. The primary current can be sensed at terminal 904, which is the central point of this voltage divider. The advantage of a voltage divider arrangement is that the current sensing gain of the system may be selected by varying the values of the two sense resistors. However, as an alternative, only a single resistor 903 could be used, with the primary current being sensed as the voltage across this single resistor. The current sensing circuit 900 will have a time constant determined by the values of the sense capacitor 901 and sense resistor(s) 902 and 903. Thus, sense circuit 900 may be considered to be a low pass filter having a cutoff frequency that is inversely proportional to the product of the capacitance of sense capacitor 901 and the total resistance of sense resistors 902 and 903. In other words, $$f_{cutoff} = \frac{1}{2\pi C_{sense}(R_{sense1} + R_{sense2})}$$

Thus, it may be desirable to select these values so that the cutoff frequency of the circuit is higher than the switching frequency. In some embodiments, the resistance and capacitance values may be selected so that the cutoff frequency of current measurement circuit 900 is between ten and one hundred times (10× to 100×) the switching frequency of converter 100. This will ensure that the sensing circuitry provides sufficient frequency response to allow effective control of converter 100.

Figure 10A:
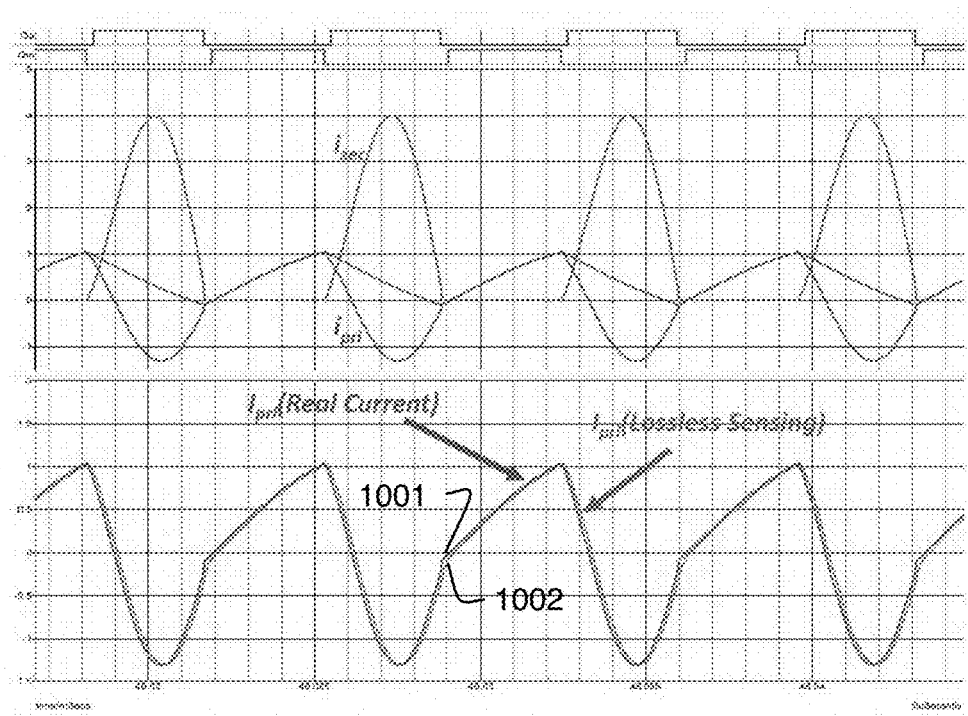
FIGS. 10A and 10B illustrate selected waveforms relating to lossless current sensing on the primary side.
Figure 10B:
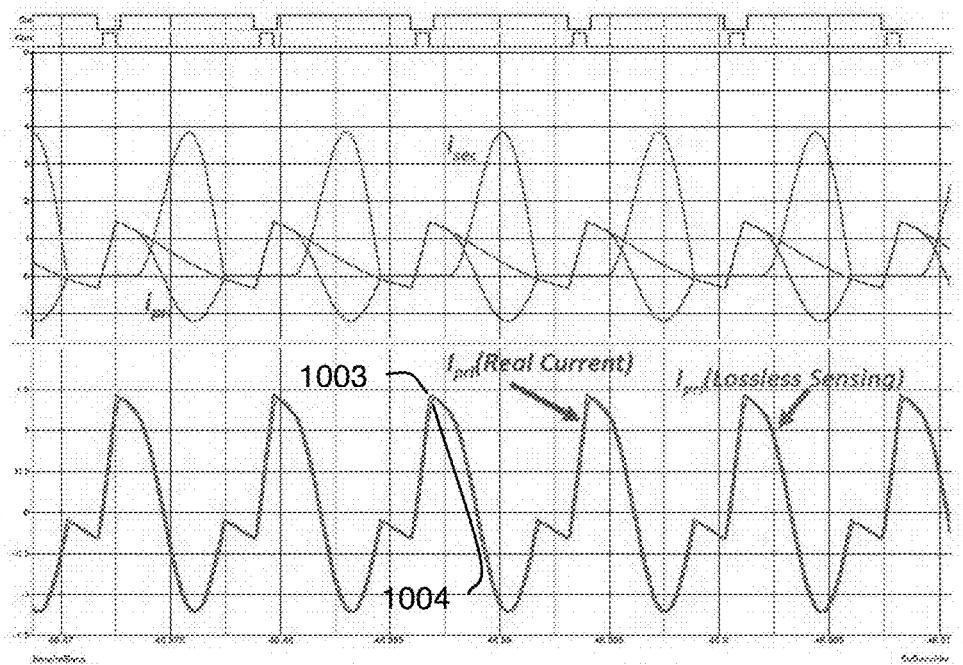

FIG. 10 illustrates two sets of current traces from an embodiment of the current sensing technique described above. Current trace 1001 is the primary current for a primary resonant flyback converter operating at a relatively low input voltage. Current trace 1002 is the corresponding output of the current sensing circuit described above. Similarly, current trace 1003 is the primary current for the same converter operating at a relatively higher input voltage with a higher switching frequency. Current trace 1004 is the corresponding output of the current sensing circuit. As can be seen, the waveforms are substantially identical, with the only deviations resulting from a slight lag or smoothing of sharp transitions, due to the effects of the capacitive-based sensing. These minor deviations are sufficiently small that they will not compromise effective control of the converter in some, or even many, embodiments. This may be, for example, because the current sensing is used primarily for overcurrent protection, rather than precise control of switch timing, frequency, or duty cycle for output regulation.

Turning back to FIG. 8, the integration of current sensing as described herein into the control loop is illustrated. At block 802, the primary current is sensed (as described above). This current may be compared to an overcurrent threshold at block 807. If the sensed current is below the threshold, then the control loop continues as described above. If the sensed current is above the overcurrent threshold, then the converter is stopped at block 806. It will also be appreciated that the sensed current may be used for other controller tasks instead of or in addition to overcurrent protection.

V. Switching Frequency Control

High power density AC-DC converters often include small size (i.e., high power density) as a design constraint. One technique for increasing power density is to increase the operating frequency, which can reduce the size of various passive components, such as the capacitors and inductors. However, switching losses are increased with increased switching frequency. In some embodiments switching losses may be addressed by varying the switching frequency. Disclosed below are various techniques for active control of switching frequency to improve efficiency in various operating domains.

A. Load and Input Voltage Compensated Switching Frequency Control

The foregoing description of primary resonant flyback converter operation has been premised on operation at a fixed switching frequency. Output voltage regulation is accomplished by variation of the duty cycle of main switch 106. In other words, output voltage regulation is achieved by varying the on time ($T_{on}$, FIG. 3) of main switch 106, while the total switching cycle time ($T_{sw}$, FIG. 3) remains constant (and is the reciprocal of the switching frequency). Although a primary resonant flyback converter can have improved full load efficiency by reducing switching losses, low load efficiency may remain relatively unimproved because low load losses are largely driven by the magnetizing current that continuously circulates on the primary side of the converter.

With reference to primary current curve 303 in FIG. 3, primary current segment 303a corresponds to the portion of the switching cycle during which main switch 106 is turned on and is related to the magnetizing current associated with primary coil 108. The slope of current segment 303a is determined by two parameters: the inductance of primary coil 108 and the DC bus voltage 104. More specifically, the slope is directly proportional to the DC bus voltage 104 and inversely proportional to the inductance of primary coil 108. The peak value of this current is thus determined by the slope and duration of the on-cycle (i.e., the amount of energy required by the load).

In some embodiments, a system designer will select the inductance value of primary coil 108 to accomplish the maximum required energy transfer per cycle (i.e., maximum rated power) at the minimum permissible voltage of DC bus 104. The minimum permissible voltage of DC bus 104 is a function of the minimum rated input voltage. However, selecting an inductor value sufficiently large to result in maximum power at minimum DC voltage may result in an inductor slope (and thus magnetizing current) that is substantially higher at low load and maximum rated input voltage, if frequency is held constant. Put another way, the inductance of primary coil 108 determines the magnetizing current at any given frequency of operation. The AC impedance of the primary coil is proportional to the inductance of the coil and the frequency of operation. Because the same primary coil 108 is used for all load conditions, the only way to vary the magnetizing current (and thus the associated losses) is to vary the frequency of operation.

At low load conditions, it may be desirable to increase the switching frequency, thereby increasing the impedance of primary coil 108. This can reduce the magnetizing current and corresponding switching losses. Reduction in switching losses can substantially improve low load efficiency of the converter. Conversely, at high load conditions, it may be desirable to decrease the switching frequency, thereby decreasing the impedance of primary coil 109. This can increase the magnetizing current, thereby allowing for decreased dead time for zero voltage switching, which can, in turn, improve full load efficiency. Thus, primary resonant flyback converter embodiments may be constructed using the techniques described below to vary the frequency of operation of the converter based on converter load.

As discussed above with respect to FIG. 1, voltage sensing and control loop 113 can sense the voltage at output terminal 102 using voltage sensing circuitry 113a. The sensed output voltage can be input into a voltage control loop 113b to generate a feedback signal 114. Feedback signal 114 can then be used to vary the duty cycle of main switch 106 to regulate output voltage 102. By extension, this also controls the complimentary duty cycle of auxiliary switch 107. The duty cycles are controlled as a function of converter load, with higher loads resulting in an increased duty cycle for main switch 106, up to a duty cycle of 50%.

Figure 11:
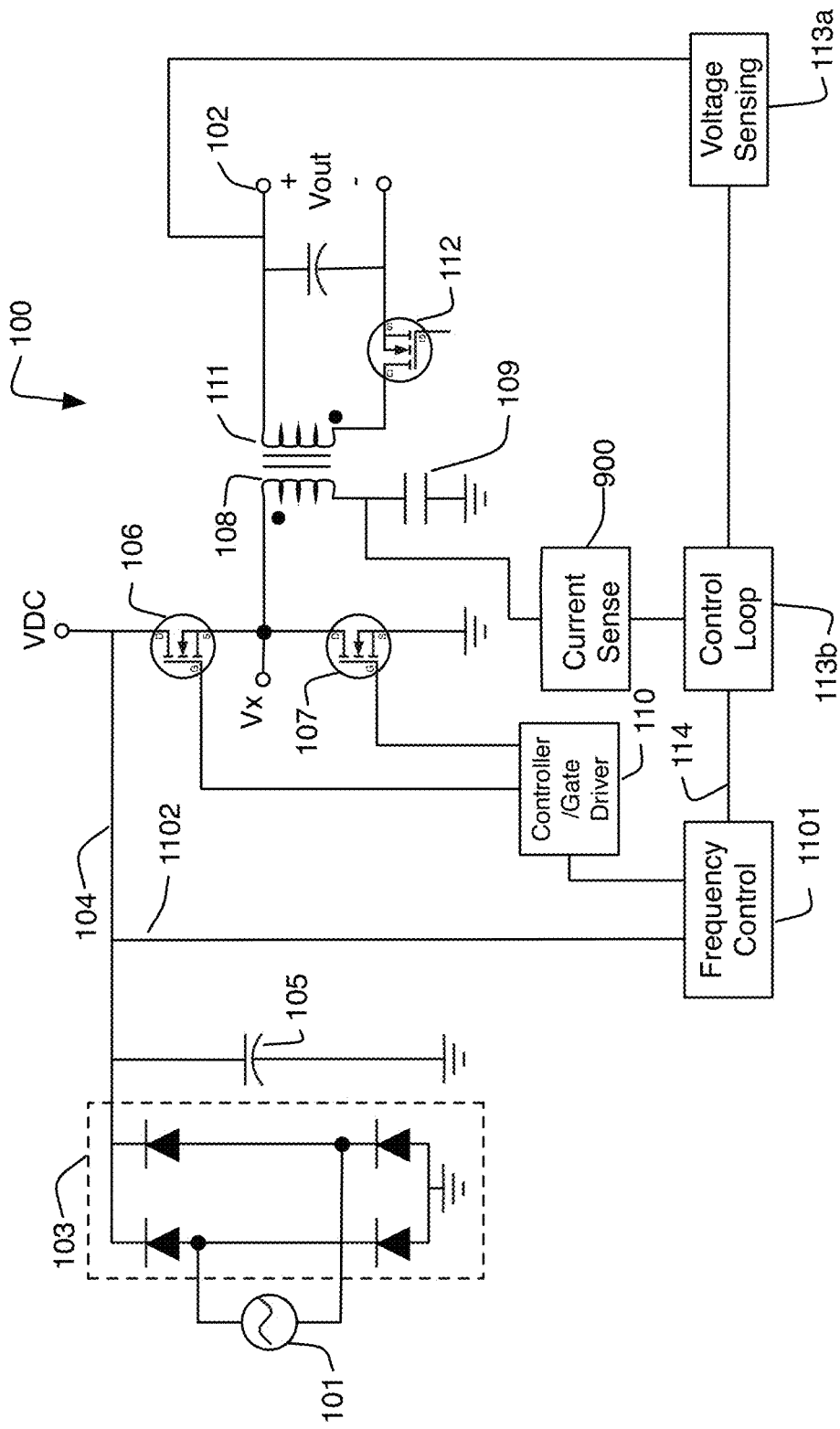
FIG. 11 illustrates a schematic diagram of a primary resonant flyback converter incorporating variable frequency control.

Thus, feedback signal 114 is indicative of the load on converter 100, and may therefore be used to control the switching frequency of the converter, as well as the duty cycles of main switch 106 and auxiliary switch 107. FIG. 11 illustrates an embodiment of a primary resonant flyback converter 100 incorporating variable frequency switching control. Unless otherwise noted, the various components of converter 100 operate as described with respect to various other embodiments. The output voltage of converter 100 is sensed at output terminal 102 by output voltage sensing circuit 113a. The sensed output voltage signal is communicated to control loop 113b, which generates a feedback signal 114. Feedback signal 114 can be communicated to frequency control block 1101, which determines the switching frequency as described in greater detail below.

Although FIG. 11 depicts an arrangement in which the output voltage is sensed on the secondary side of the converter, variable frequency switching may also be implemented in cases in which the output voltage is sensed on the primary side as described above. Thus, the optocoupler or other component providing galvanic isolation between primary and secondary has been omitted from the drawing for clarity, although it may be included in the circuit as required.

Generally, frequency control block 1101 may be configured to provide an appropriate switching frequency and duty cycle as a function of converter load. As discussed above, low load conditions may call for an increase in switching frequency, while high loads call for a decrease in switching frequency. Thus, frequency control block 1101 may comprise two analog control loops that provide an output frequency drive signal and a duty cycle signal as a function of output load, derived from feedback signal 114. Alternatively, either or both control loops may be implemented digitally, or using hybrid analog/digital circuitry. In some embodiments, the switching frequency may be inversely proportional to feedback signal 114 (which is itself proportional to load current). In other embodiments, the frequency control loop may include a lookup table that selects from a plurality of discrete frequencies based on the magnitude of feedback signal 114. The lookup table may be generated based on designed/calculated values, empirical testing, or a combination thereof The frequency and duty cycle control signals may be provided to controller 110, which generates the gate drive signals for main switch 106 and auxiliary switch 107.

When implementing variable frequency switching, some additional signal or context may be desired to provide control of duty cycle and switching frequency. For example, the magnetizing current of primary coil 108 may be kept constant by maintaining a constant voltage to frequency ratio between the voltage of DC bus 104 and the switching frequency. More generally, the range of magnetizing current may be constrained by constraining this voltage to frequency ratio. Thus, the voltage of DC bus 104 (which is a direct function of the AC input voltage) may used as a further input signal 1102 into frequency control block 1101. The voltage of DC bus 104 may be sensed by any of a variety of voltage sensing circuits, which are omitted from FIG. 11 for clarity. In such embodiments, the DC bus voltage signal 1102 may be fed into a first control loop that outputs a frequency selection signal to controller 110, wherein the voltage to frequency ratio is kept constant or constrained to a desired range. Thus, an increase in DC bus voltage may result in a corresponding increase in switching frequency, while a decrease in DC bus voltage may result in a corresponding decrease in switching frequency.

Feedback signal 114, which is a function of converter load may be used solely to control the duty cycle of main switch 106 (and, by extension, the complimentary duty cycle of auxiliary switch 107), while the DC bus voltage signal 1102 is used solely to control the switching frequency. Alternatively, a two input control loop may be implemented in which both the DC bus voltage signal 1102 and the feedback signal 114 are used to select output frequency. As above the switching frequency control loop and the duty cycle control loop may be implemented using analog, digital, or hybrid circuitry, lookup tables, and other controller implementations. In some embodiments, frequency control block 1101 may be implemented using a two dimensional lookup table that provides switching frequencies for various combinations of output load (derived from feedback signal 114) and DC bus voltage (derived from DC voltage bus signal 1102). As above, the table values may be linear as a function of input voltage, but will vary non-linearly as a function of load, and so may be derived by calculation, empirical testing, or a combination thereof.

Although frequency control block 1101 has been depicted separately from controller 110 and output voltage sensing block 113a and output voltage control loop 113b, these components may be combined into a single controller when output voltage sensing is performed on the primary side of converter 100, as described above. Additionally, such controller 110 may also receive a current signal from current sensing circuitry 900, also described above. In those embodiments, controller 110 may be configured to provide overcurrent protection or otherwise use the sensed current as desired to control operation of converter 100. In some embodiments, the off time of main switch 106 may be controlled with reference to the sensed current from current sensing circuitry 900.

Figure 12A:
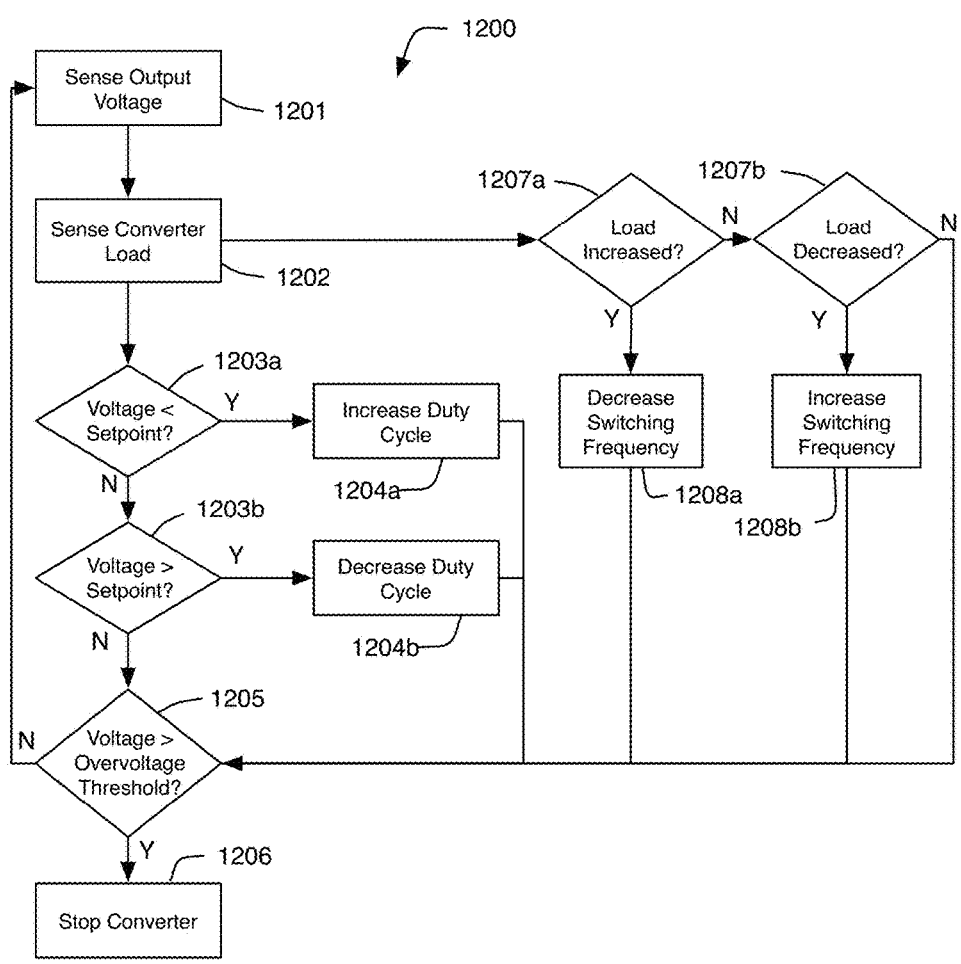
FIGS. 12A and 12B illustrate flowchart of variable frequency control algorithms.

FIG. 12A depicts a flowchart illustrating a switching frequency control algorithm 1200 incorporating some of the features described above. The switching frequency control algorithm may be implemented by a single controller, such as controller 110, voltage control loop 113b, primary side controller 610 (FIG. 6), or a combination of controllers such as control loop 113b and frequency controller 1101 illustrated in FIG. 11. As with the other control algorithms discussed herein, the controllers may be implemented using analog circuitry, digital circuitry, or hybrid analog/digital circuitry.

Beginning at block 1201, the converter output voltage is sensed. The output voltage may be sensed on the secondary side of the controller (as depicted in FIG. 1, for example) or on the primary side of the converter (as depicted in FIG. 6, for example). Additionally, the converter load is detected at block 1202. As discussed above, the converter load may be sensed using feedback signal 114 or other suitable signal or measurement. In blocks 1203a, 1203b, 1204a, and 1204b, the sensed output voltage is used to control the duty cycle of main switch 106 as discussed above. In block 1207a, the controller determines whether the load as increased. If so, the switching frequency may be decreased (block 1208a). In block 127b, the controller determines whether the load has decreased. If so, the switching frequency may be decreased. In any case, control returns to (optional) block 1205 for overvoltage protection as discussed above. Additionally, for sake of clarity, overcurrent protection has been omitted from FIG. 12, but it will be appreciated that an overcurrent loop as described above with respect to FIG. 8 (or other overcurrent protection loop) could also be included.

Figure 12B:
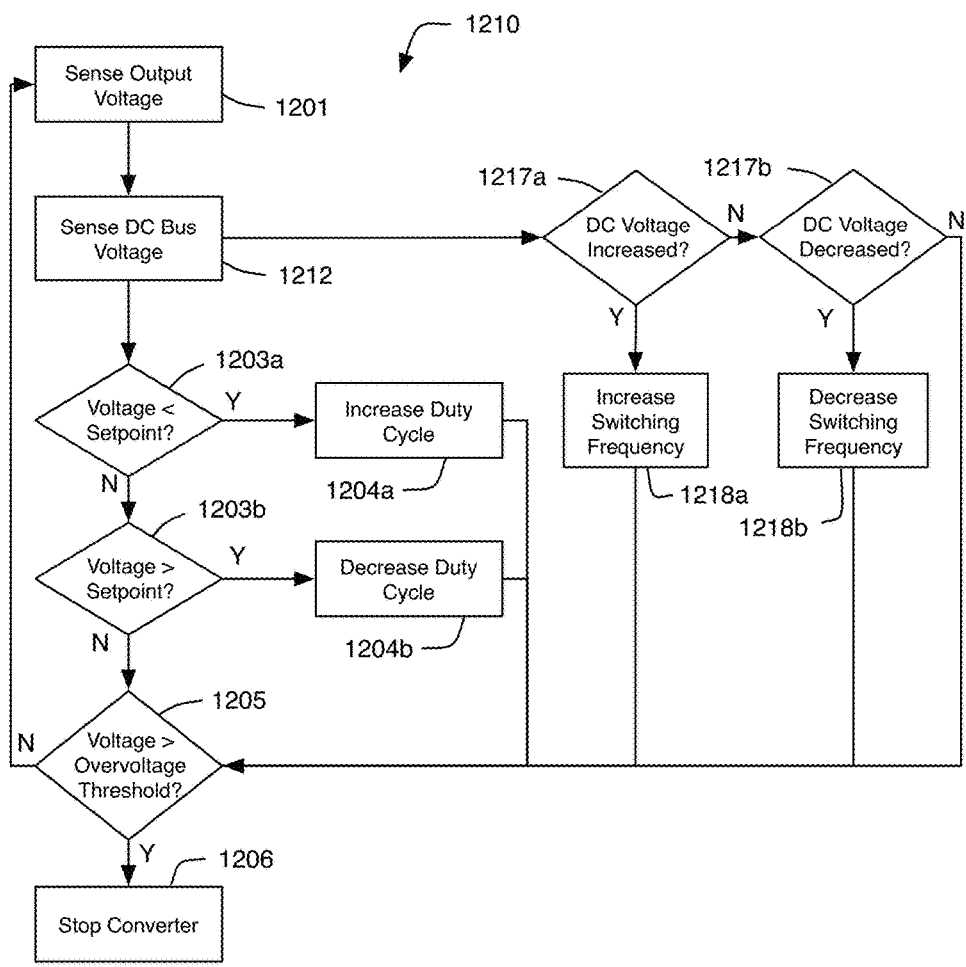

FIG. 12B depicts a flowchart illustrating an alternative switching frequency control algorithm 1210 based on sensing DC bus voltage (as discussed above). Like numbered control blocks function as described above. Algorithm 1210 senses DC bus voltage as indicated by connection 1102 in FIG. 11 at block 1212. If the DC bus voltage has increased (block 1217a), then the switching frequency may be increased (block 1218a) as discussed above. Alternatively, if the DC bus voltage has decreased (block 1217b), the switching frequency may be decreased (block 1218b). This can allow the voltage/frequency to be kept constant, as discussed above.

As discussed above, the switching frequency control loop may be based on a combination of load sensing and input voltage sensing, in which case the control loops 1200 and 1210 may be combined into a single control loop. Additionally, the flow charts of FIGS. 12A and 12B are depicted generally to illustrate the underlying control concepts. It will be appreciated that the specifics of the control algorithm may vary from implementation to implementation and that variations on the illustrated flowcharts are possible.

B. DC Ripple Voltage Compensated Switching Frequency Control

Turning back to FIG. 11, it will be appreciated that DC bus 104 will have a low frequency ripple corresponding to the frequency of AC input power source 101. It can further be shown that this ripple voltage varies as a function of AC input voltage and load condition. More specifically, the ripple voltage will increase with decreases in the AC voltage supplied and will also increase with increased load on the converter. In some embodiments it may be desirable to limit this ripple voltage.

Classical approaches to reducing ripple voltage have focused on DC bus capacitor 105. More specifically, increasing the size of capacitor 105 will tend to decrease the ripple voltage. In many embodiments, capacitor 105 may be the physically largest component in the circuit. It is not uncommon for a DC bus capacitor to take up 20~40% of the volume of a small AC-DC adapter. If a large ripple voltage is present because of a smaller DC bulk capacitor 105, this low frequency ripple voltage can be appear at the output voltage terminal. In some cases, it may be difficult to eliminate this ripple voltage at the output because its frequency is too low. However, because physical size is often a significant design constraint, it is generally desirable that capacitor 105 (like the other components) be no larger than necessary.

In the power converter embodiments discussed herein, varying the switching frequency of main switch 106 and auxiliary switch 107 can be used to help reduce the ripple voltage appearing at output terminal 102. In other words, the switching frequency of the main and auxiliary switches may be controlled as a function of DC ripple to minimize or reduce the low frequency ripple voltage appearing at output terminal 102. Conceptually, this is very similar to the input voltage compensated switching frequency control discussed above. Recall that the voltage of DC bus 104 may be used to select the switching frequency for main switch 106 and auxiliary switch 107. Because ripple voltage is a component of the DC bus voltage, the frequency control techniques discussed above may be tuned to also account for ripple voltage in selecting the output frequency.

The ripple voltage frequency is the same frequency as the AC power supply (e.g., 50-60 Hz) for a half-bridge rectifier, or twice the AC power supply frequency for a full bridge rectifier (e.g., 100-120 Hz). The switching frequency range of the converter will be chosen based on a variety of design constraints, but will usually be much higher (in the hundreds of kHz range) than the AC power supply frequency. Additionally, the ripple voltage frequency is usually much lower than the overall bandwidth of the control system for the converter. Thus, adapting the DC bus voltage controlled frequency selection discussed above to also account for ripple voltage may be achieved with relatively straightforward tuning of the voltage-based frequency selection techniques described above. For simplicity, if the above described control technique is based on a steady state value of the DC bus voltage, adapting it for ripple control may be thought of as a slightly faster "real time" voltage based control. In some embodiments, the table-based control described above may be expanded to a three dimensional table indicating an appropriate switching frequency as a function of steady state DC bus voltage and ripple voltage.

C. Burst Mode Operation

As described above, the switching frequency of main switch 106 and auxiliary switch 107 may be varied as a function of load on the converter to improve efficiency. More specifically, as the load on the converter decreases, increasing the switching frequency can increase the impedance of primary coil 101, thereby reducing the circulating magnetizing currents associated with the primary coil and reducing conduction losses associated with these circulating currents. However, there are practical limits on how much the switching frequency may be increased. As load continues to decrease, it may be desirable to temporarily shut down switching of the converter. At that point, there are no switching losses, nor any conduction losses, yet the low amount of load may still be powered by residual energy stored in the system, for example in the output capacitor. As this energy is used by the load, the output voltage ($V_{out}$) will begin to drop, triggering reactivation of switching in the circuit. This type of operation may be referred to as burst mode, i.e., the switching components are operated in bursts during low load conditions.

As was discussed above, feedback signal 114 is indicative of the output load on the converter and, in at least some embodiments, may be proportional to load current. In other words, high load levels will result in a high level of feedback signal 114, while low loads will result in a low level of feedback signal 114. Thus, feedback signal 114 may be used to control the burst mode operation of converter 100. In some embodiments, a hysteretic control algorithm may be used. In some embodiments, the hysteretic control algorithm may be implemented by additional circuitry and/or programming in frequency controller 1101. Alternatively, an additional burst mode controller may be provided, or the burst mode controller may be implemented with one of the other control components.

Figure 15:
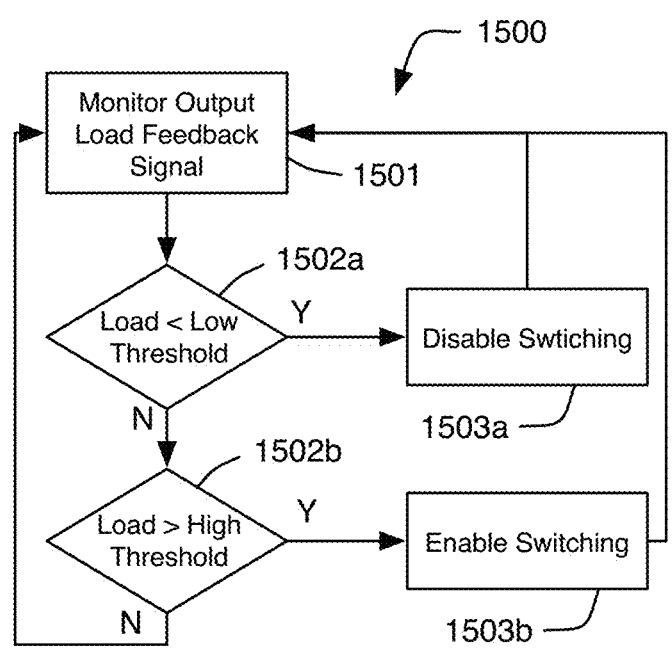
FIG. 15 illustrates a flowchart for a burst mode control algorithm.

The hysteretic control algorithm for burst mode control may be configured to operated as follows and illustrated in FIG. 15. A high threshold and low threshold may be selected for feedback signal 114. The high threshold may correspond to the load condition at which switching should be enabled. The low may correspond to the load level at which switching should be disabled. When load on the converter decreases to the low load threshold (152a), switching of main switching device 106 and auxiliary switching device 107 may be disabled (1503a). As feedback signal 114 increases to the high threshold (1502a), switching of main switching device 106 and auxiliary switching device 107 may be re-enabled (1503b). Once switching is re-enabled, the switching may take place at a fixed frequency or at a variable frequency as described above.

Figure 13:
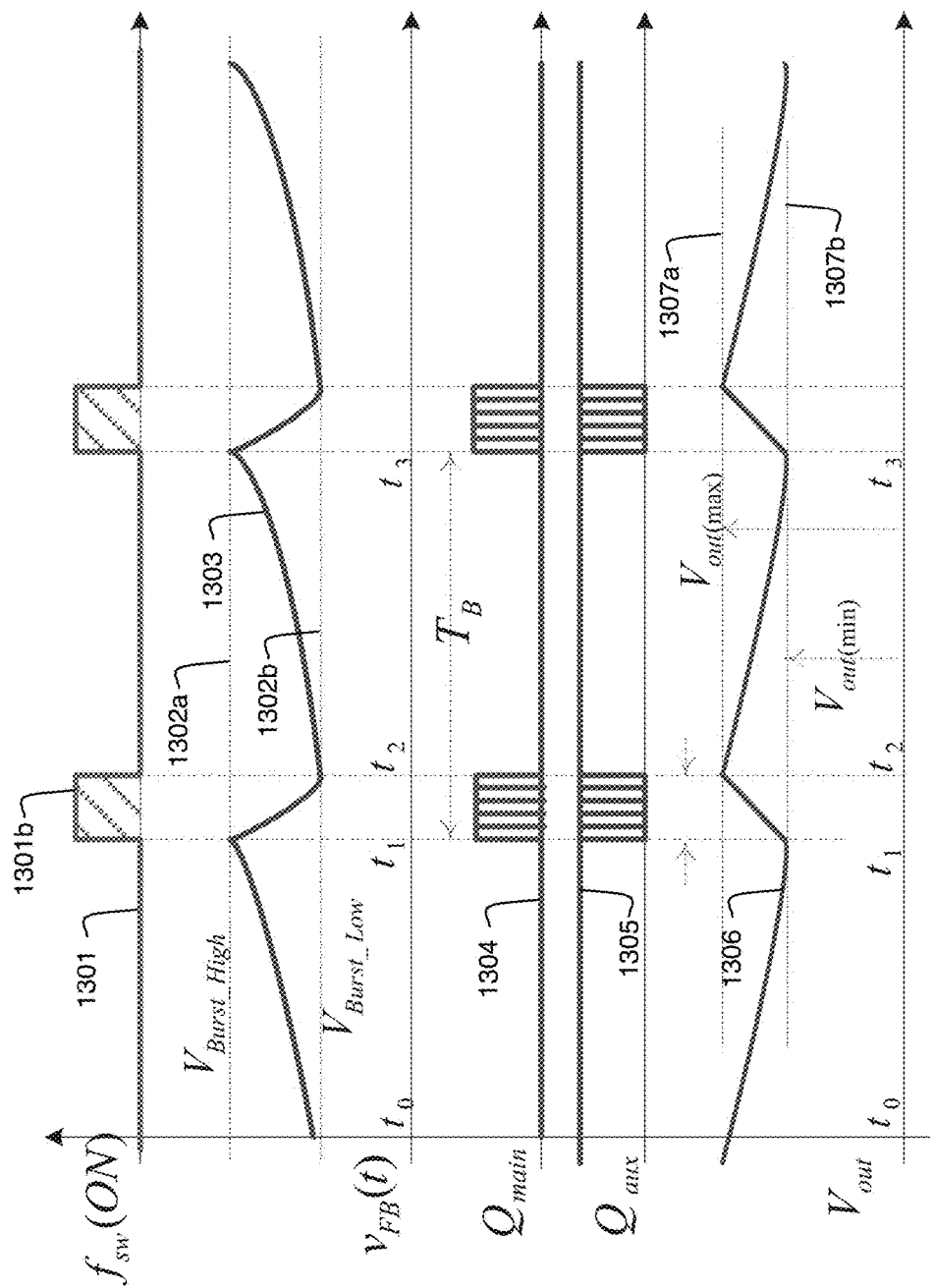
FIG. 13 illustrates selected waveforms of a primary resonant flyback converter incorporating burst mode operation.

FIG. 13 illustrates pertinent waveforms associated with burst mode operation. Signal 1303 represents the instantaneous value of feedback signal 114. Starting at time to, switching is disabled. As the output voltage 1306 decreases to its minimum output voltage threshold 1307b, feedback signal 1303 correspondingly increases until it reaches high threshold 1302a. This triggers enabling of switching, which can be seen in drive signal 1304 for main switch 106 and drive signal 1305 for auxiliary switch 107. Additionally, signal 1301 indicates whether switching is enabled or disabled, and thus may be seen to transition high in region 1301b, corresponding to the activation of switching. Because the load on the converter is relatively light, after a short time interval ending at time $t_2$, output voltage 1306 can be seen to have recovered to its maximum value 1307a. Corresponding feedback signal 1303 has decreased to low threshold 1302b, which triggers deactivation of switching, as may be seen in signals 1301, 1304, and 1305. Then, from time $t_2$ to time $t_3$, the output voltage decreases (at a rate determined by the load) until the output voltage again reaches output voltage minimum threshold 1307b, at which time corresponding feedback signal 1303 has again reached high threshold 1302a, and the cycle repeats.

Figure 14:
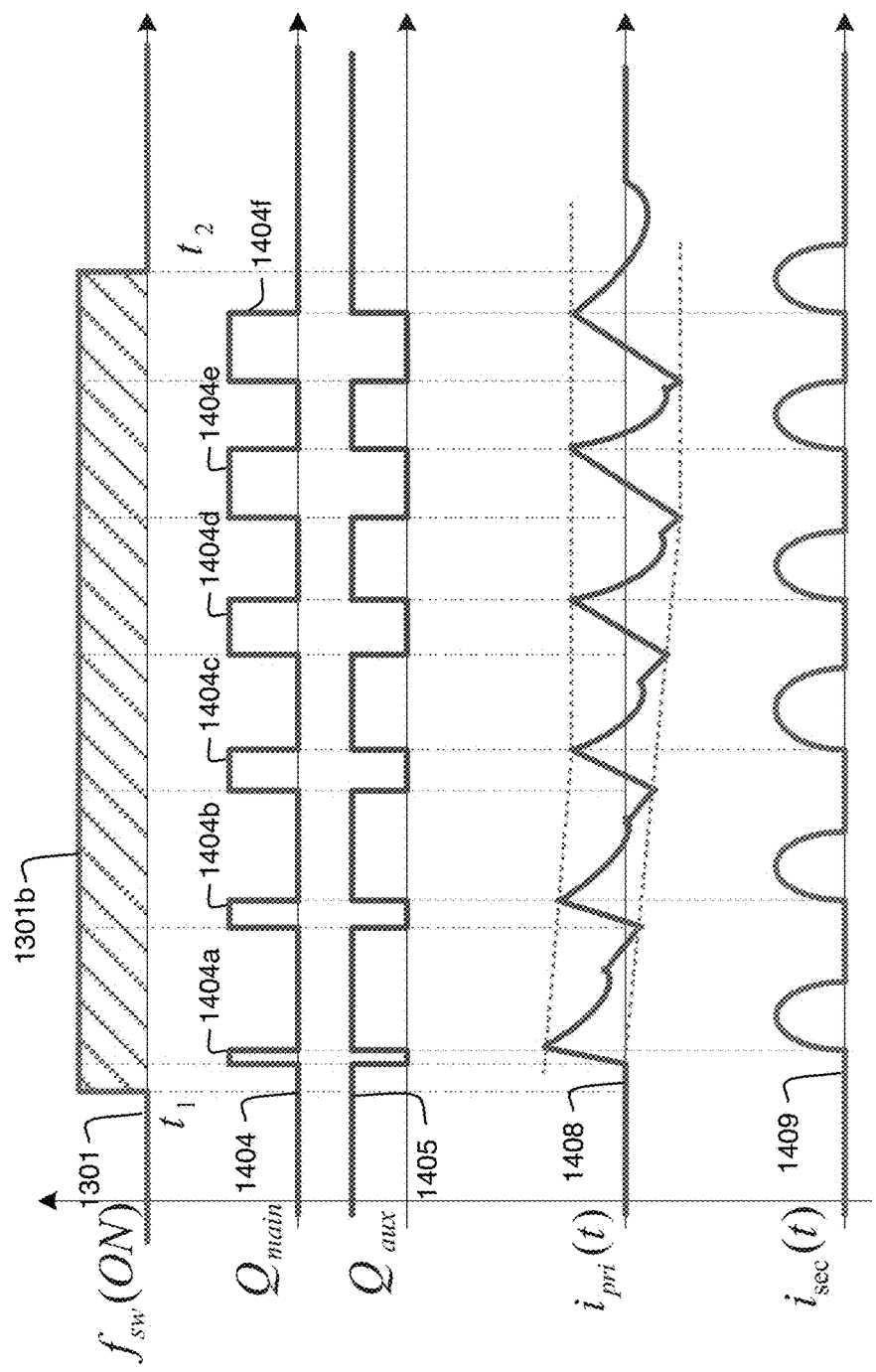
FIG. 14 illustrates selected waveforms of a primary resonant flyback converter incorporating burst mode operation with soft starting of the burst mode.

Because the resonant circuit (and particularly resonant capacitor 109) may be completely discharged as a result of burst mode operation, resuming switching operations may result in a high current spike associated with recharging the resonant capacitor. Thus, in some embodiments, it may be desirable to have a soft start of the switching operations. This may be achieved, for example, but slowly increasing the duty cycle of main switch 106 over the first several switching cycles when switching is re-enabled (1503b; FIG. 15). Pertinent waveforms for such an embodiment are illustrated in FIG. 14. Switching enable signal 1301 transitions to high state 1301b, indicating the onset of switching operations. Main switch 106 drive signal 1404 is controlled so as to provide a sequence of gate drive pulses 1404a, 1404b, 1404c, 1404d, 1404e, and 1404f of increasing duration. (Recall that auxiliary switch 107 is driven with an opposite duty cycle that allows for some dead time.) This results in the primary current waveform 1408 and secondary current waveform 1409 illustrated, in which the RMS primary current gradually increases and the secondary current pules gradually increase in width. This results in a smoother transition from the switching disabled state to the switching enabled state.

In some embodiments, it may be desirable to transition from continuous switching operation to burst mode switching operation such that the initial burst mode of operation will result in a relatively long switching enabled duration with a relatively short switching disabled time. This may be achieved by adjusting the high threshold for feedback signal 114. In some embodiments, the transition to burst mode operation may occur at around 50% load, although this transition could also occur between 40% to 50% load, or at even lower loads, such as 20% to 40%. Any transition point may be selected by a designer based on the particular goals and requirements of a particular system. Another factor to consider in implementing burst mode operation is that certain burst frequencies may result in audible noises. Thus, the burst mode frequency or range of frequencies may be selected so as to be outside the range of human hearing (roughly 20 Hz to 20 kHz). This may also affect the transition load at which burst mode operation is implemented.

V. Power Factor Corrected/Boost Topology

Flyback converters are used in a variety of applications, such as AC adapters for personal electronic devices with power ratings ranging from 5 W (or sometimes less) up to 100 W (or sometimes more). However, once the power rating of a converter is higher than 65 W, applicable regulations (or even good engineering practice) may dictate that the converters include some form of power factor correction.

Power factor is a measure of load reactance and is defined as the cosine of the phase difference between the voltage supplied and the current delivered. A purely resistive load will have the current in phase with the voltage and will thus have a power factor of 1. A purely capacitive load supplied with a fixed frequency AC voltage will have the current leading the voltage by 90 degrees and will thus have a leading power factor of 0. A purely inductive load supplied with a fixed frequency AC voltage will have the current lagging the voltage by 90 degrees, and will thus have a lagging factor of 0. Loads with a resistive and net inductive component will have a lagging power factor between 0 and 1. Loads with a resistive and net capacitive component will have a leading power factor between 0 and 1.

The various converter topologies discussed above will generally present a leading power factor because the DC bus capacitor 105 is directly presented to the input power source 101. In practice, the power factor will vary as a function of load and DC bus capacitor size, but a leading power factor is generally expected. It would be desirable for a flyback converter to present an additional inductive load component to the power source 101 that could balance out the capacitive component presented by DC bus capacitor 105. Previous converters requiring power factor correction have inserted a power factor correction stage in front of the main converter stage. In some implementations of such two-stage circuits the power factor correction stage may be expected to operate with an efficiency of approximately 95%, while the converter stage also operates at a peak efficiency around 95%. Thus, the overall efficiency of the circuit is reduced to something in the range of 90% or less. It would thus be desirable to integrate the power factor correction inductor with the remainder of the power converter to achieve higher efficiency.

Figure 16:
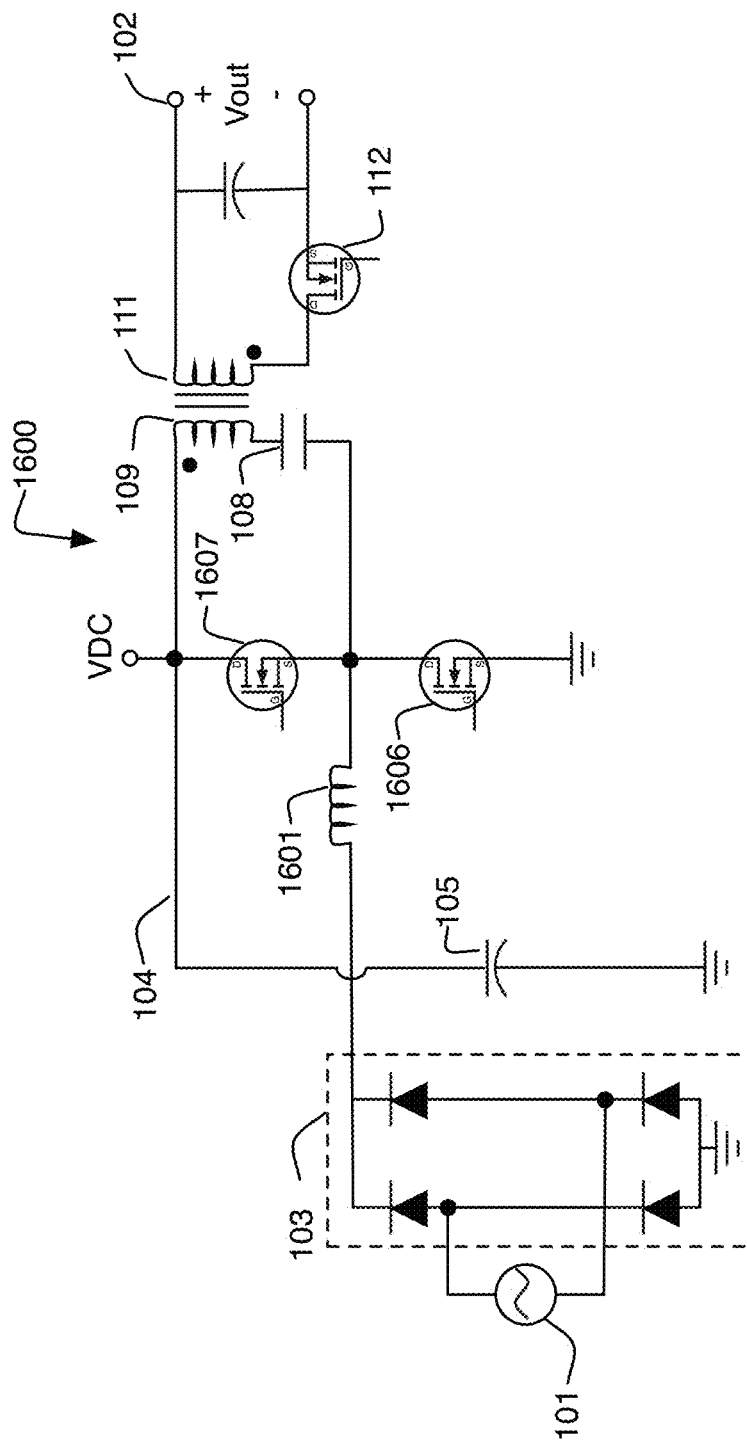
FIG. 16 illustrates a schematic diagram of a power factor corrected primary resonant flyback converter.

FIG. 16 depicts an embodiment of a power factor corrected primary resonant flyback converter 1600 that includes input inductor 1601. The input inductor 1601 may be used for power factor correction and also input voltage boosting as described further below. Power factor corrected primary resonant flyback converter 1600 includes similar components to the various embodiments described above, which are numbered the same. FIG. 16 also shows various differences between the power factor corrected primary resonant flyback converter 1600 and the various embodiments described above. First, input inductor 1601 is coupled to the output of rectifier 103 and coupled to the junction of main switch 1606 and auxiliary switch 1607. Second, DC bus capacitor 105 is coupled to the input through input inductor 1601 and body diode of auxiliary switch 1607. Third, main switch 1606 and auxiliary switch 1607 have been reversed, so that auxiliary switch is coupled to the DC voltage bus 104 and main switch is coupled to ground. Finally, primary winding 109 and resonant capacitor 108 are coupled between DC bus 104 and the junction of main switch 1606 and auxiliary switch 1607 (rather than the junction and ground as in most embodiments described above). It will be appreciated that this arrangement is generally similar to converter 401, illustrated in FIG. 4 and discussed above.

Figure 17:
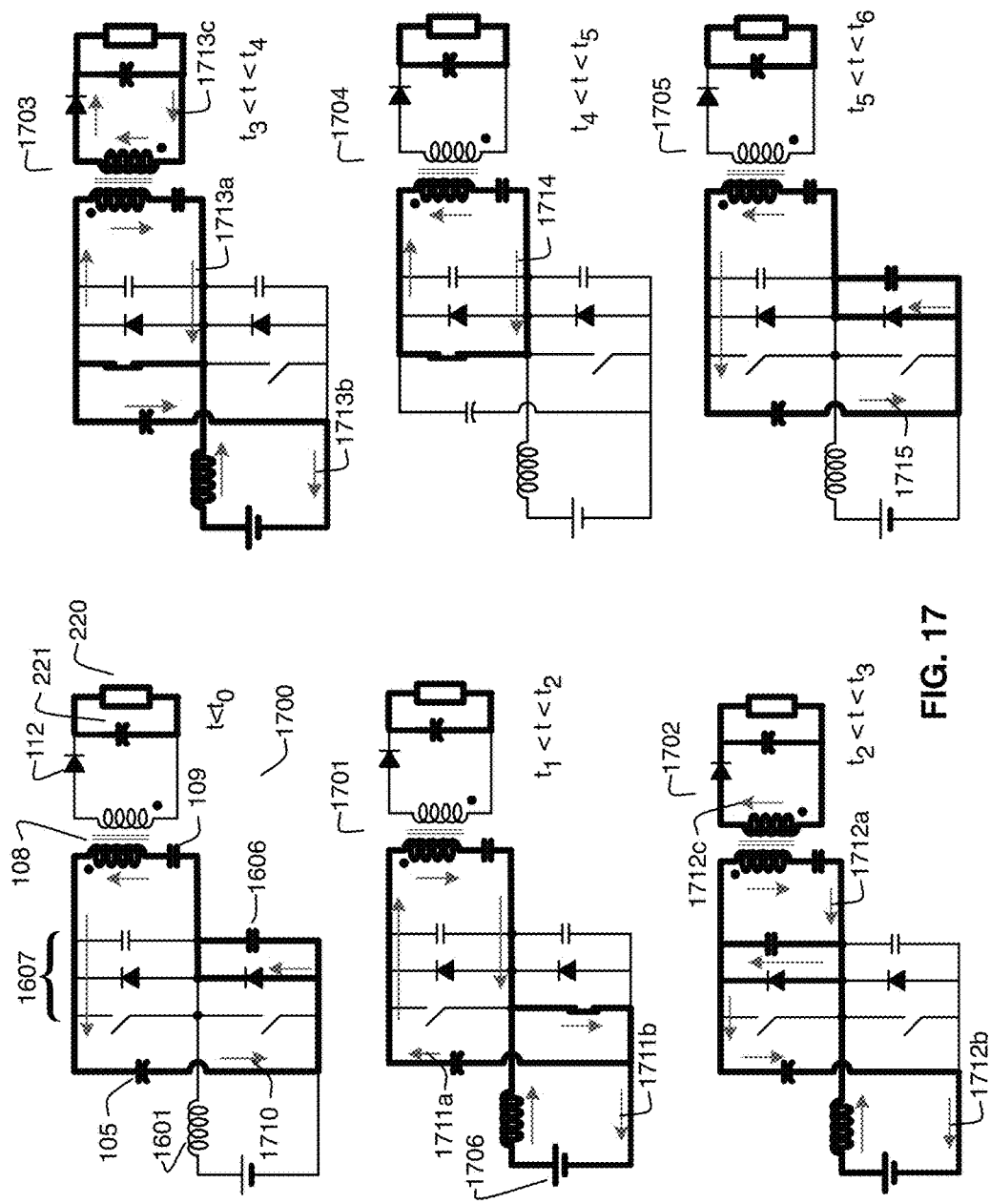
FIG. 17 illustrates a switching sequence of a power factor corrected primary resonant flyback converter.
Figure 18:
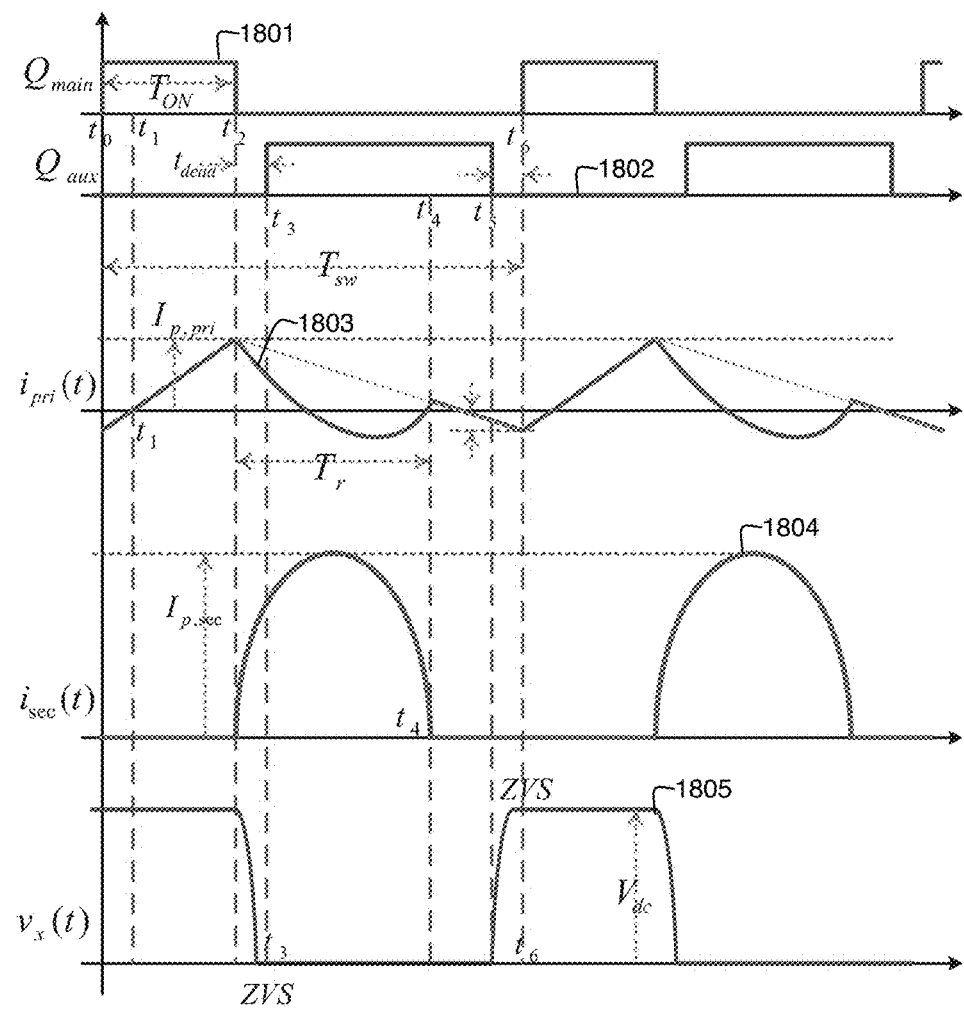
FIG. 18 illustrates selected waveforms of a power factor corrected primary resonant flyback converter.

FIGS. 17 and 18 illustrate the switching sequence of the power factor corrected primary resonant flyback converter 1600. FIG. 17 illustrates a series of schematics depicting the equivalent circuit of the converter at various points during the switching cycle. FIG. 18 illustrates pertinent waveforms and times during the switching cycle. Schematic 1700 in FIG. 17 depicts the circuit just prior to turning on main switch 1606 (i.e., just prior to time $t_0$). Main switch 1606 and auxiliary switch 1607 are depicted throughout FIG. 17 as their respective equivalent circuits, each comprising a parallel connected switch, body diode, and drain to source capacitance. Just prior to main switch 1606 closing, current 1710 is flowing through the body diode of switch 1606, resonant capacitor 109, and primary winding 108 to charge DC bus capacitor 105. Because current is flowing through the body diode of main switch 1606, the main switch closure at time to is a zero voltage switching (ZVS) event, thereby reducing the switching losses associated with operation of the circuit.

When main switch 1606 closes at time to, for a short period of time, current will continue flowing upward through primary winding 108 for a brief period of time before reversing. The reversal of this current occurs at time $t_1$. Schematic 1701 depicts the circuit during the time period beginning at $t_1$ and extending until main switch 1606 is opened at time $t_2$. During this time period, there are two currents on the primary side of the converter. A first current 1711a flows from DC bus capacitor 105, through primary winding 108, resonant capacitor 109, and main switch 1606 to ground/back to DC bus capacitor 105. A second current 1711b flows from the rectified power source 1706, through input inductor 1601 and main switch 1606 to ground/back to rectified power source 1706. The combined current through main switch 1606 is thus the sum of currents 1711a and 1711b.

At time $t_2$ main switch 1606 opens. There is a brief dead time $t_{dead}$ before auxiliary switch 1607 closes at time $t_3$. (The nature and purpose of this dead time were discussed above.) Equivalent circuit 1702 depicts the converter during the time period between $t_2$ and $t_3$. There are two primary side currents during this time period. A first primary side current 1712a is the continued current flow through primary winding 108, which passes through resonant capacitor 109, body diode of auxiliary switch 1607, and DC bus capacitor 105, back to ground. This current recharges DC bus capacitor 105 with a portion of the energy that was stored in primary winding 108. The second primary side current 1712b is the continued current flow through input inductor 1601, which passes through the body diode of auxiliary switch 1607 and DC bus capacitor 105, back to ground. This current recharges DC bus capacitor 105 with a portion of the energy that was stored in input inductor 1601. Because these currents are flowing through the body diode of auxiliary switch 1607, the closure of auxiliary switch 1607 at time $t_3$ can be a zero voltage switching (ZVS) event. Also during this time period, secondary side current 1712c begins to flow through rectifier 112 to load 220 and also charging output capacitor 221.

At time $t_3$, auxiliary switch 1607 closes. The time period beginning at time $t_3$ and extending until time $t_4$ (when the energy stored in input inductor 1601 has been completely transferred to DC bus capacitor 105) is depicted in schematic 1703. As before, there are two currents on the primary side of the converter. A first primary side current 1713a is the continued current flow through primary winding 108, which passes through resonant capacitor 109, now closed auxiliary switch 1607, and DC bus capacitor 105, back to ground, recharging DC bus capacitor 105 with a portion of the energy that was stored in primary winding 108. The second primary side current 1713b is the continued current flow through input inductor 1706, which passes through now closed auxiliary switch 1607 and DC bus capacitor 105, back to ground, recharging DC bus capacitor 105 with a portion of the energy that was stored in input inductor 1601. Also during this time period, secondary side current 1713c continues to flow through rectifier 112 to load 220 and also charging output capacitor 221.

Schematic 1704 depicts the time period beginning at time $t_4$ (when the energy stored in input inductor 1601 has been completely discharged) and extending until time $t_5$, when auxiliary switch 1607 is opened. During this time period current 1714 reverse circulates through primary winding 108, resonant capacitor 109, and auxiliary switch 1607 (due to resonance). Schematic 1705 depicts the time period beginning at time $t_5$ (when auxiliary switch 1607 opens) and extending until time $t_6$, which corresponds to time $t_0$, i.e., the time at which main switch 1606 closes again. The currents circulating on the primary side were described above with respect to schematic 1700.

As noted above, FIG. 18 depicts various circuit waveforms during the switching cycle of the power factor corrected primary resonant flyback converter. Waveform 1801 depicts the drive signal for main switch 1606. In the illustrated embodiment, drive signal 1801 is high when main switch 1606 is on (from time $t_0$ to time $t_2$) and low when main switch 1606 is off (from time $t_2$ to $t_6$). It will be appreciated that if a p-channel switch were used, drive signal would be low/on and high/off. Similarly, waveform 1802 illustrates the drive signal for auxiliary switch 1607, which is on from time $t_3$ to time $t_5$. FIG. 18 also illustrates the dead time $t_{dead}$ between time $t_2$ when main switch 1606 is switched off and time $t_3$ when auxiliary switch 1607 is switched on.

Waveform 1803 illustrates the current through primary winding 108 during the switching cycle. Features of this waveform include: the region between $t_0$ and $t_1$ when the current through primary winding 108 has not yet switched to the positive direction; the linear ramp up of primary current during the on time of main switch 1606 between time $t_0$ and $t_1$; and the resonance of the primary current during the period $t_2$ to $t_6$ when main switch 1606 is open, including the brief increase and reversal associated with total discharge of the input inductor 1601 at time $t_4$. Waveform 1804 illustrates quasi-sinusoidal current through secondary winding 111 discussed above. Finally, waveform 1804 illustrates the voltage appearing across the combination of primary winding 108 and resonant capacitor 109 during the switching cycle. In short, when main switch 1606 is closed, the full DC bus voltage appears across the combination. When main switch 1606 is closed (and auxiliary switch 1607 is opened) the voltage across the combination of these two components is zero (because they have equal and opposite voltages across each other during the resonant phase).

As discussed with respect to other embodiments, the duty cycle of main switch 1606 is controlled as a function of output load. More specifically, higher loads will result in higher duty cycles (up to a duty cycle of 50% for the half bridge configuration illustrated in FIG. 16). As will be appreciated, main switch also controls the operation of input inductor 1601 (as distinguished from prior art embodiments in which a separate boost converter and/or power factor correction circuit might be used to input into a flyback converter). Thus, while input inductor 1601, main switch 1606, and body diode of auxiliary switch 1607 form a boost converter, the output of which is delivered to DC bus capacitor 105, separate boost control is not required.

Because the converter is operated to provide a regulated output voltage without regard to the input voltage, the duty cycle of main switch 1606 self-compensates for the different input voltages. However, in some embodiments it might be desirable to add additional circuitry to prevent voltage runaway of the boosted voltage appearing at the downstream terminal of input inductor 1601. In some embodiments, this additional circuitry may be additional control circuitry that alters the switching of main and/or auxiliary switches 1606 and 1607 (which may be analog, digital, or hybrid control circuitry). In other embodiments, this additional circuitry may be some form of clamping circuitry. Additionally, a combination of additional control circuitry and additional clamping circuitry could be provided.

It will further be appreciated that operation of the circuit as described above will result in a much improved power factor and smoother charging currents (because of elimination of the current spikes associated with presenting DC capacitor to the input power source). In some embodiments, the input inductor size may be selected so as to provide near unity power factor operation over a desired operating range.

Conclusion

Described above are various features and embodiments relating to primary resonant flyback converters. Such converters may be used in a variety of applications, but may be particular advantageous when used in conjunction with power adapters and/or battery chargers for portable electronic devices such as mobile telephones, smart phones, tablet computers, laptop computers, media players, and the like as well as the peripherals associated therewith. Such associated peripherals can include input devices (such as keyboards, mice, touchpads, tablets, and the like), output devices (such as headphones or speakers), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A primary resonant flyback converter comprising:
   a primary winding;
   a secondary winding magnetically coupled to the primary winding and electrically coupled to an output rectifier, and an output terminal;
   a resonant capacitor coupled in series with the primary winding;
   a main switch configured to switch on to energize the primary winding and resonant capacitor from a DC voltage bus and to switch off to transfer energy stored in the primary winding to the secondary winding;
   an auxiliary switch configured to switch on during an off time of the main switch thereby allowing a resonant current to circulate through the primary winding and the resonant capacitor; and
   a control circuit configured to:
      vary a duty cycle of the main switch and the auxiliary switch to produce a desired voltage at the output terminal; and
      vary a switching frequency of the main switch and the auxiliary switch responsive to a change in output load on the primary resonant flyback converter in combination with at least one of an input voltage into the primary resonant flyback converter and a DC bus voltage of the primary resonant flyback converter.

2. The primary resonant flyback converter of claim 1 wherein the control circuit is configured to vary the switching frequency by increasing the switching frequency responsive to a decrease in output load or by decreasing the switching frequency responsive to an increase in output load.

3. The primary resonant flyback converter of claim 1 wherein the control circuit detects a change in output load with reference to a feedback signal from an output voltage control loop.

4. The primary resonant flyback converter of claim 1 wherein the control circuit is configured to vary the switching frequency of the main switch and the auxiliary switch responsive to both the change in output load and the input voltage.

5. The primary resonant flyback converter of claim 4 wherein the control circuit is further configured to maintain a constant ratio between the DC voltage bus and the switching frequency of the main switch and the auxiliary switch.

6. The primary resonant flyback converter of claim 1 wherein the control circuit configured to vary the switching frequency of the main switch and the auxiliary switch responsive to the DC voltage bus of the primary resonant flyback converter is further configured to vary the switching frequency of the main switch and the auxiliary switch responsive to a voltage ripple on the DC voltage bus.

7. The primary resonant flyback converter of claim 6 wherein the control circuit is configured to vary the switching frequency by increasing the switching frequency in response to a decreased ripple voltage or by decreasing the switching frequency in response to an increased ripple voltage.

8. A method of operating a power converter, the method comprising:
sensing an output voltage of the power converter;
sensing at least one of a load on the power converter and an input voltage into the power converter;
varying a duty cycle of a main switch of the power converter to produce a desired output voltage; and
varying a switching frequency of the main switch responsive to the load on the power converter in combination with at least one of the input voltage into the power converter and a DC voltage bus of the power converter.

9. The method of claim 8 wherein varying the switching frequency of the main switch responsive to at least one of the load and the input voltage comprises at least one of:
increasing the switching frequency responsive to a decrease in output load; and
decreasing the switching frequency responsive to an increase in output load.

10. The method of claim 8 wherein sensing a load on the power converter comprises sensing a feedback signal from an output voltage control loop.

11. The method of claim 8 wherein varying the switching frequency of the main switch responsive to at least one of the load on the power converter and the input voltage into the power converter comprises varying the switching frequency responsive to both the load and the input voltage.

12. The method of claim 11 wherein varying the switching frequency responsive to both the load and the input voltage comprises maintaining a constant ratio between a DC voltage bus of the power converter and the switching frequency.

13. The method of claim 8 wherein varying the switching frequency of the main switch responsive to the DC voltage bus of the power converter further comprises varying a switching frequency of the main switch responsive to a ripple voltage on a DC bus of the power converter.

14. The method of claim 13 wherein varying the switching frequency of the main switch responsive to a ripple voltage on a DC bus of the power converter further comprises at least one of:
increasing the switching frequency in response to a decreased ripple voltage; and
decreasing the switching frequency in response to an increased ripple voltage.

15. The method of claim 8 wherein varying a switching frequency of the main switch responsive to the load on the power converter comprises temporarily disabling operation of the main switch responsive to a decrease in output load on the power converter.

16. The method of claim 15 further comprising re-enabling operation of the main switch responsive to an increase in output load on the power converter.

17. A primary resonant flyback converter comprising:
a primary winding;
a secondary winding magnetically coupled to the primary winding and electrically coupled to an output rectifier, and an output terminal;
a resonant capacitor coupled in series with the primary winding;
a main switch configured to switch on to energize the primary winding and resonant capacitor from a DC voltage bus and to switch off to transfer energy stored in the primary winding to the secondary winding;
an auxiliary switch configured to switch on during an off time of the main switch thereby allowing a resonant current to circulate through the primary winding and the resonant capacitor; and
a control circuit configured to:
implement a hysteretic control algorithm to temporarily disable and re-enable operation of the main switch and the auxiliary switch responsive to a decrease in output load on the primary resonant flyback converter.

18. The primary resonant flyback converter of claim 17 wherein the control circuit is configured to re-enable operation of the main switch and the auxiliary switch responsive to an increase in output load.

19. The primary resonant flyback converter of claim 18 wherein the hysteretic control algorithm references a high threshold corresponding to a load condition at which switching should be enabled and a low threshold corresponding to a load condition at which switching should be disabled.

20. The primary resonant flyback converter of claim 19 wherein the high and low thresholds are compared to a feedback signal from the output voltage control loop.

* * * * *